(12) United States Patent
Matsushima

(10) Patent No.: US 7,640,403 B2
(45) Date of Patent: Dec. 29, 2009

(54) IMAGE PROCESSING APPARATUS IN WHICH AN EXTERNAL APPLICATION IS EXECUTED FROM A STORAGE DEVICE

(75) Inventor: Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 988 days.

(21) Appl. No.: 10/650,715

(22) Filed: Aug. 29, 2003

(65) Prior Publication Data

US 2004/0109187 A1 Jun. 10, 2004

(30) Foreign Application Priority Data

Aug. 30, 2002 (JP) ............... 2002-255970
Aug. 27, 2003 (JP) ............... 2003-303423

(51) Int. Cl.
*G06F 13/00* (2006.01)
(52) U.S. Cl. ............... 711/154; 711/167; 717/174; 702/183
(58) Field of Classification Search ............... 711/154
See application file for complete search history.

(56) References Cited

U.S. PATENT DOCUMENTS

| | | | | |
|---|---|---|---|---|
| 5,724,425 A | * | 3/1998 | Chang et al. ............... | 705/52 |
| 5,787,491 A | * | 7/1998 | Merkin et al. ............... | 711/173 |
| 5,861,957 A | * | 1/1999 | Nagata ............... | 358/296 |
| 6,104,506 A | | 8/2000 | Hirokawa | |
| 7,289,237 B2 | * | 10/2007 | Takei ............... | 358/1.15 |

FOREIGN PATENT DOCUMENTS

| | | |
|---|---|---|
| JP | 02-250559 | 10/1990 |
| JP | 05-020186 | 1/1993 |
| JP | 05-181759 | 7/1993 |

OTHER PUBLICATIONS

U.S. Appl. No. 10/419,192, filed Apr. 21, 2003.
U.S. Appl. No. 09/753,582, filed Jan. 4, 2001, Matsushima.
U.S. Appl. No. 09/985,367, filed Nov. 2, 2001, Matsushima.
U.S. Appl. No. 09/985,484, filed Nov. 5, 2001, Matsushima.
U.S. Appl. No. 10/025,758, filed Dec. 26, 2001, Matsushima.
U.S. Appl. No. 10/938,563, filed Sep. 13, 2004, Matsushima.
U.S. Appl. No. 12/051,226, filed Mar. 19, 2008, Matsushima.

* cited by examiner

*Primary Examiner*—Hetul Patel
(74) *Attorney, Agent, or Firm*—Oblon, Spivak, McClelland, Maier & Neustadt, L.L.P.

(57) ABSTRACT

A composite machine performs various types of image processing with executing relevant applications, wherein: upon starting an application stored in a hard disk drive, predetermined diagnosis processing is performed on the hard disk drive beforehand; and, upon starting an application stored in a flash memory, the application is startable independently from the predetermined diagnosis processing being performed on the hard disk drive.

26 Claims, 15 Drawing Sheets

FIG.5

```
                               221
PROGRAM NAME    xx.xxx.sample
PROGRAM NAME    yy.yy.test
                      .
                      .
                      .
```

FIG.6

| | 222 |
|---|---|
| PROGRAM NAME | xx.xxx.sample |
| DISPLAY NAME | SAMPLE APPL. |
| VERSION | 1.0 |
| VENDER NAME | ABC CORP. |
| EXECUTION COMMAND | sample_apl -a1 |
| INSTILLATION MEDIUM NUMBER | 1 |
| INSTALLATION MEDIA TOTAL | 2 |
| INSTALLED INSTALLATION MEDIA NUMBER | 1 |
| INSTALLATION TIME | 2002.5.20 |
| LICENSE KEY | 1122-111-333 |

FIG.9

INSTALLER

APPL TO BE INSTALLED

| APPL | VER. | VENDER NAME | NO. | | |
|---|---|---|---|---|---|
| CERTIFY APPL | 1.0 | ABC SOFT. | 2/3 | | INSTALL |

APPL INSTALLED

| APPL | VER. | VENDER NAME | INSTALL DATE | STATUS | |
|---|---|---|---|---|---|
| CERTIFY APPL | 1.0 | ABC SOFT. | 2002.7.1 | 1/3 | UNINSTALL |
| CHARGE APPL | 1.1 | XYZ CO. | 2002.5.1 | OK | UNINSTALL |
| TEST APPL | 2.0 | EFG.CO. | 2002.12.10 | OK | UNINSTALL |

IMAGE PROCESSING APPARATUS IN WHICH AN EXTERNAL APPLICATION IS EXECUTED FROM A STORAGE DEVICE

BACKGROUND OF THE INVENTION

1. Field of the Invention

The present invention relates to an image processing apparatus such as a copier, a printer, a scanner, a facsimile machine, or a so-called composite machine which has all or some of the functions of these devices, and, in particular, to an image processing apparatus in which an external application which is newly provided is stored in a storage device, and the external application is started from the storage device.

In recent years, an image processing apparatus which performs functions, of respective devices, such as a printer, a copier, a facsimile machine, and a scanner, within a single housing, so-called a composite machine is known. This composite machine operates as respective devices such as a printer, a copier, a scanner, or a facsimile machine with a provision of three types of software corresponding to the printer, a copier, and a facsimile machine, and executes such software in turn appropriately in use of various hardware resources such as a display part, a printing part, an image pick-up part, etc. within the same housing.

Such a composite machine may have, so-called a large-capacity storage device, such as a hard disk drive (HDD). Such a large-capacity storage device provided in such a composite machine is used mainly for the purpose of storing image data, but may not be used for the purpose of storing software programs or application programs which are executed therefrom as in a general purpose computer such as a personal computer. This is because such a type of large-capacity storage device (HDD or so) has not necessarily a sufficient reliability or may be likely to have a trouble as compared with other storage devices. Accordingly, such a type of large-capacity storage device may not be suitable as a storage device for the purpose of storing firmware or so in a so-called inclusion machine such as a composite machine, a copier or so in which a mechanical device including a moving part such as a printing device, a scanning device or so, which may cause a vibration, a heat or so, is provided together with computer parts such as a CPU, a storage device and so forth, which computer parts, in general, should be protected from the vibration, heat or so.

In fact, in case a large-capacity storage device has a trouble due to the above-mentioned vibration, heat or so, this trouble may not be removed by a user in general, and, thus, a repair work should be made by a special staff such as a customer engineer of a manufacturer or so for each time of trouble occurrence. As a result, the operation costs increase accordingly, and thus, the user's impression on the machine itself may become worse.

For the purpose of avoiding such a situation, according to the conventional art, such a large-capacity storage device is not used for storing application programs, but such firmware is written into an internal memory (ROM: Read Only Memory or so) before the shipment of the machine.

SUMMARY OF THE INVENTION

In such a composite machine, software for driving the machine as a printer, a copier, a scanner, and a facsimile machine is created separately, respectively. For this reason, a creation of each type of software may take a great time. The applicant of the present application proposes an image processing apparatus (composite machine or so) having a configuration described below as a solution of this problem.

That is, in addition to hardware resources used for image formation processing such as a display device, a printing device, an image pick-up device, etc., a composite machine has a plurality of applications (programs) which cause the machine in an appropriate use of the hardware resources to perform processing respectively particular to each user service such as that providing a function of the printer, copier, or facsimile machine. There, a platform, which will be described below, is inserted between these applications and the hardware resources. The platform means programs referred to as various sorts of control services which, in performing the above-mentioned user services, perform an operation of managing the hardware resources which the above-mentioned applications need in common, an execution control operation, and an image formation processing operation.

With such a new configuration, the applications and the control services which have functions of accessing the hardware resources and in general thus have difficulties in creation in some case are created separately. Moreover, such a new composite machine has a function in that, after the shipment of the composite machine, a user or a third vendor may create a new application (referred to as an external application), and the thus-obtained new application is newly installed and is used there for adding/inserting a new function to the machine. For this purpose, such an external application should be installed apart from other applications (referred to as existing applications) concerning standard image formation processing such as a copy function, a printer function, a scanner function, a facsimile function, etc., which are incorporated in the machine before the shipment.

However, generally it is difficult to incorporate an external application after the shipment to a so-called built-in memory of the composite machine. Moreover, another reason for a possible difficulty in adding/inserting an external application after the shipment is a matter concerning the storage capacity of the built-in memory, which may not have been determined in consideration of such a situation of adding a new application. Then, the above-mentioned large-capacity storage device may be used for providing another storage area for storing the external application as a solution of this problem.

However, for this purpose, it is necessary to solve the above-mentioned problem concerning the reliability of such a large-capacity storage device. In addition, a special concern may be taken for the purpose of coping with starting applications not only from the built-in memory as in the conventional configuration but also from the large-capacity storage device which pattern of starting an application may not be included in the conventional art.

Objects of the present invention are to attain the above-mentioned purposes, and, in particular, to additionally provide various functions by inserting and starting external applications with maintaining the reliability of the composite machine.

According to a first aspect of the present invention, there are provided with a first storage (such as a flash memory) which stores applications and has no function for newly writing information thereto; and a second storage (such as a hard disk drive) which also stores applications and has a function of newly writing information. In this configuration, an image processing apparatus performs image processing using various sorts of applications stored in these storages. In case an application stored in the second storage is started, the application can be started after a predetermined diagnostic processing is performed on the second storage, while an application stored in the first storage is started independently from the above-mentioned diagnostic processing of the second storage.

According to this configuration, after the diagnosis of the second storage, i.e., the above-mentioned large-capacity storage device, is completed, the external application stored in this large-capacity storage device is started. Therefore, even when the large-capacity storage device, which may have not a sufficient reliability in itself as mentioned above, is used as another storage area for external applications, the reliability of the image processing apparatus can be maintained.

Thus, the problem involved in starting of the external application from the large-capacity storage device can be solved, and an addition or insertion of external applications can be made arbitrarily after the shipment of image processing apparatus using the large-capacity storage device. Consequently, with such external applications, various functions can be newly inserted into the image processing apparatus.

The above-mentioned external applications handled in the present invention may be any applications of those mentioned above which can be used as programs for providing various user services in the relevant image processing apparatus. These external application are programs which may be created separately from the applications installed in the image processing apparatus before the shipment. Moreover, such external applications may include applications which are not only those which is created by a supplier of the image processing apparatus but also applications which are created by third parties, such as a customer of the image processing apparatus, a third vendor or so.

Such an external application is one for inserting a new optional function to the composite machine. For example, a so-called form control function may be inserted in use of an external application. By applying this form control function, for example, the composite machine can be used for printing out predetermined types of forms with a simple operation of a user. That is, upon applying this form control function, the operation panel of the machine is customized specially for the purpose of outputting the present invention types of forms. Thus, it becomes easier for the user to output the predetermined types of forms.

Moreover, a diagnosis of the large-capacity storage device according to the present invention is one in a level such as that sufficient for proving that an external application stored therein can be properly started therefrom. For example, this diagnosis may include an inspection for determining whether or not any physical defect occurs in information storage elements, or whether the consistency concerning a file system for the storage device is established properly, or so. However, any other items of diagnosis may be included therein.

The diagnosis performed on the large-capacity storage device may be performed not only by a process which is originally provided for starting external applications, but also by a certain process, other than a program specially for starting external applications. In such a case, a result of the diagnosis may be received by the process for starting external applications from the certain process via a communication means such as that prepared for inter-process communication.

As the large-capacity storage device in the present invention, not only a hard disk drive (HDD) but also another storage medium such as an SD memory card may be applied.

Moreover, it is preferable to provide a special part for performing initialization processing of the image processing apparatus. In this case, a predetermined external application starting part is initialized by this initialization part, and, thus, it is started. According to this configuration, since the external application starting part is started by the initialization part which originally performs initialization processing of the image processing apparatus, the external application can be started during a predetermined series of initialization processes of the image processing apparatus. Consequently, it becomes unnecessary to insert any other special processing part for starting of the external applications even when the external applications are newly inserted, and thus, it becomes possible to easily achieve various new functions in the image processing apparatus by the thus-inserted external applications.

The above-mentioned initialization part may be that which performs, for example, starting of processes, such as those of existing applications, control services, etc. which are those operating in the image processing apparatus. Any other configuration may also be applied as the above-mentioned initialization part. For example, a part which performs initialization processing of hardware resources, a part which performs a diagnosis of a predetermined controller board, or so may be applied for the same propose.

Moreover, in the above-mentioned image processing apparatus, a diagnostic part may be provided for specially performing diagnostic processing of the above-mentioned large-capacity storage device, and, after a diagnostic result is given indicating no special problem, the above-mentioned external application starting part starts the external application stored in the above-mentioned large-capacity storage device. With this configuration, after it is determined that the diagnostic result indicates no special problem, and this matter is notified to the external application starting part from the diagnostic part which has performed the diagnostic processing of the large-capacity storage device, the external application stored in the large-capacity storage device is started thereby. Thus, diagnosis of the large-capacity storage device can be performed separately from the starting operation performed by the external application starting part. Thereby, the external application starting part can perform a predetermined pre-processing for starting of the external application, etc. in parallel to or independently from the diagnostic processing performed on the large-capacity storage device. Consequently, the total time required for the completion of starting of the external application can be effectively reduced.

According to a second aspect of the present invention, a predetermined starting permission information is set which indicates whether or not starting of applications from the above-mentioned second storage (HDD or so) is permitted, and, when the setting of this information indicates that starting of applications from the second storage is permitted, the application is actually started from the second storage. With this configuration, the external application starting part starts the external applications from the large-capacity storage device (HDD or so), when the starting permission information indicates that starting from the large-capacity storage device of external applications is permitted. That is, a user can arbitrarily set a permission of starting of the external applications from the large-capacity storage device, and can put a restriction against a use of the external applications from the large-capacity storage device depending on the user's intention.

Accordingly, in case some trouble occurs in all or a part of the external applications stored in the large-capacity storage and this may cause a problem in performing operation of the image processing apparatus, the starting permission information may be set as indicating that starting of the external applications is not performed in a lump. Thus, the setting can be made such that only the basic/standard applications which are installed before the shipment are started, and, thus, the stability of the image processing apparatus in case of the external applications have a trouble can be secured.

According to a third aspect of the present invention, a function of displaying a setting window on which a user can set the above-mentioned starting permission information is provided with on a display screen or so. With this configuration, the setting window for setting the starting permission information is thus displayed, and the starting permission information thus set by the user is then applied to the machine. Consequently, the user of image processing apparatus can easily set permission or inhibition of starting of the external application from the large-capacity storage device, and, thus, the user can easily control the operation of external application.

This starting permission information should just setting permission or inhibition of starting of the external applications from the large-capacity storage device. However, in case external applications may also be started from another type of non-volatility recording medium such as a flash card (for example, an SD memory card), permission/inhibition of starting from the non-volatility recording medium may also be set there in addition to the setting of permission/inhibition of starting from the large-capacity storage device.

According to a fourth aspect of the present invention, an image processing apparatus includes a first storage (flash memory or so) which stores applications and has no function for inserting new applications by an operator; a second storage (HDD or so) for storing applications, with a function of inserting new applications to the apparatus, and with a function for newly writing information thereto; and a third storage (IC card or so) for storing applications, with a function of inserting new applications to the apparatus and without a function for newly writing information thereto. Also this image processing apparatus performs image processing using various sorts of applications stored in these storages. In case an application stored in the second storage is started, the application is started after a predetermined diagnostic processing is performed on the storage, while an application stored in the third storage is started independently from the diagnostic processing of the second storage.

With this configuration, after diagnosis of the second storage, i.e., the above-mentioned large-capacity storage device, is completed, starting of the external applications stored in this large-capacity storage device can be made, while the third storage, i.e., an external application recording medium (such as an SD card or so), can be used as a storage area for external applications in addition to the large-capacity storage device. Thus, starting of the external applications from the large-capacity storage device can be performed, with maintaining the reliability of image processing apparatus, as in the above-mentioned first aspect of the present invention. Thereby, both the above-mentioned external application recording medium and the large-capacity storage device can be used for inserting external applications after the shipment of image processing apparatus, and after that, starting these applications therefrom can improve the convenience of the user by achieving various functions. Accordingly, it becomes possible to insert various new functions to the image processing apparatus.

As in the above-mentioned fourth aspect of the present invention, the external applications are created separately from those originally installed in the image processing apparatus. Also, a predetermined external application starting part may be provided for performing the diagnosis of the large-capacity storage device or any other part may perform the same in a process. Furthermore, the large-capacity storage device in this case may be a recording medium such as an SD memory card other than a hard disk drive (HDD).

Further, in case the diagnostic part diagnoses the above-mentioned large-capacity storage device also in this case, the above-mentioned external application starting part starts the external application stored in the above-mentioned large-capacity storage device after it is determined that no special problem is found out in the diagnostic performed by the above-mentioned diagnostic part. In case the above-mentioned diagnostic part has found out a problem in the large-capacity storage device, it is preferable that only external applications stored in the above-mentioned external application recording medium are started while no external applications are started from the large-capacity storage device according to the fourth aspect of the present invention.

According to this configuration, the external application starting part starts external applications from the large-capacity storage device after no problem occurs as a result of diagnosis on the large-capacity storage device, while, starting external applications only from the external application recording medium (third storage) when a problem occurs as a result of diagnosis on the large-capacity storage device (second storage). Thereby, even when the large-capacity storage device has a trouble, a starting processing can be continued from the external application recording medium and thus the image processing apparatus can achieve insertion of new functions by the external applications started from the external application recording medium.

According to a fifth aspect of the present invention, starting of applications from the second storage is made when predetermined starting permission information indicates that starting from the second storage of the application is permitted in the above-mentioned starting permission information. According to this configuration, the external application starting part starts the external application from the large-capacity storage device, i.e., the second storage, when a setting is made in the starting permission information that starting of external application from the large-capacity storage device, i.e., the second storage, is permitted. On the other hand, the external application starting part starts only external applications from the external application recording medium, i.e., the third storage, when a setting is made in the starting permission information that starting of external application from the large-capacity storage device, i.e., the second storage, is not permitted. Consequently, permission/inhibition of starting of the external applications from the large-capacity storage device can be arbitrarily determined, thus a restriction can be put on a use of the external applications from the large-capacity storage device if it is needed, and in this case, various functions by the external applications can be achieved from the external application recording medium.

According to a sixth aspect of the present invention, same as in the above-mentioned third aspect of the present invention, a function of displaying a setting window on which a user can set the above-mentioned starting permission information is provided with on a display screen. With this configuration, the setting window for setting the starting permission information is displayed, and the starting permission information thus set by the user is then applied. Consequently, the user of image processing apparatus can set permission or inhibition of starting of the external applications from the large-capacity storage device, and, thus, the user can easily control the operation of external applications.

This starting permission information should just setting permission or inhibition of starting of the external application from the large-capacity storage device. However, as external applications can also be started from another type of non-volatility recording medium such as a flash card (for example, an SD memory card), that is, the above-mentioned third storage device, permission/inhibition of starting from the non-volatility recording medium may also be set in addition to a setting of permission/inhibition of starting from the large-capacity storage device.

According to a seventh aspect of the present invention, a validity of a predetermined license which is set on an application is checked, and, then, when the check result indicates that the license is valid, the application is started. With this configuration, the external application starting part determines the validity of the license of the external application, and when the license is determined as valid, it starts the above-mentioned external application. As a result, the security of external application can be improved, or copy right is properly protected.

An installation part may be provided for installing a program into the above-mentioned large-capacity storage device, and, it is preferable that the above-mentioned external application is one which is once installed by this installation part into that large-capacity storage device. As a result, since the external application is thus installed in the large-capacity storage device by the installation part, it becomes easier to achieve various new functions in the image processing apparatus thanks to the function of the installation part.

According to the above-mentioned first aspect of the present invention, a hard disk drive etc. can be used, after shipment of image processing apparatus, for the purpose of inserting an external application and then staring it, and thus, various new functions can be achieved in the image processing apparatus.

Moreover, it becomes unnecessary to create a special processing for starting of an external application even in case the external application is inserted as a result of the external application is started during a predetermined series of initialization processing of the image processing apparatus, and it becomes easier that various new functions are achieved in the image processing apparatus. Furthermore, the external application starting part may perform a processing of a pre-processing for starting of the external application, etc., in parallel to the diagnostic processing during diagnosis of the hard disk drive, as a result of diagnoses the hard disk drive is performed separately from operation of the external application starting part. Consequently, the time required for starting up the external application can be effectively reduced.

Moreover, according to the second aspect of the present invention, permission/inhibition of starting of an external application from a hard disk drive can be determined by a user, and thus a restriction can be put on a use of the external application from the hard disk drive if needed. Moreover, according to this second aspect of the present invention, starting of external application can be restricted in a lump and thus the stability of the image processing apparatus can be secured even in case the external application has a trouble.

According to the third aspect of the present invention, a user of the image processing apparatus can set a permission/inhibition of starting of the external application from the hard disk drive freely, and thus, the user can easily control the operation of the external application.

According to the fourth aspect of the present invention, starting of the external application from the hard disk drive (second storage) and from the external application recording medium (third storage) may be attained. That is, both the hard disk drive and the external application recording medium (SD card etc.) are applied as storage areas for the external applications, with maintaining the reliability of image processing apparatus. Thereby, the external application recording medium and the hard disk drive can be used for newly inserting external applications after the shipment of image processing apparatus, the external applications can thus be inserted and started arbitrarily there, and as a result, various functions can be achieved in the image processing apparatus. Furthermore, even when the hard disk drive have a trouble, starting of the external application can be continued and image processing apparatus can be made to realize the function by the external application from the external application recording medium.

According to the fifth aspect of the present invention, various functions can be achieved by the external applications from the external application recording medium, while, if necessary, a restriction may be put on a use of applications from the hard disk drive depending on the user's arbitrary setting operation.

According to the sixth aspect of the present invention, as in the above-mentioned third aspect of the present invention, a user of the image processing apparatus can set a permission/inhibition of starting of the external application from the hard disk drive freely, and thus, the user can easily control the operation of the external application.

According to the seventh aspect of the present invention, the security of external application can be improved or a copy right can be properly protected.

Moreover, the installation part can perform an insertion of external applications easily, and it becomes easier to achieve various functions in the image processing apparatus.

BRIEF DESCRIPTION OF THE DRAWINGS

Other objects and further features of the present invention will become more apparent from the following detailed description when read in conjunction with the accompanying drawings.

FIG. 5 is a diagram showing an example of the contents of a starting setting file in the composite machine according to the first embodiment of the present invention;

FIG. 6 is a diagram showing an example of the contents of an application description file in the composite machine according to the first embodiment of the present invention;

FIG. 9 shows an example of an installer window displayed on the composite machine according to the first embodiment of the present invention;

DETAILED DESCRIPTION OF THE PREFERRED EMBODIMENTS

With reference to drawings, image processing apparatuses in respective embodiments of the present invention will now be described.

Figure 1:
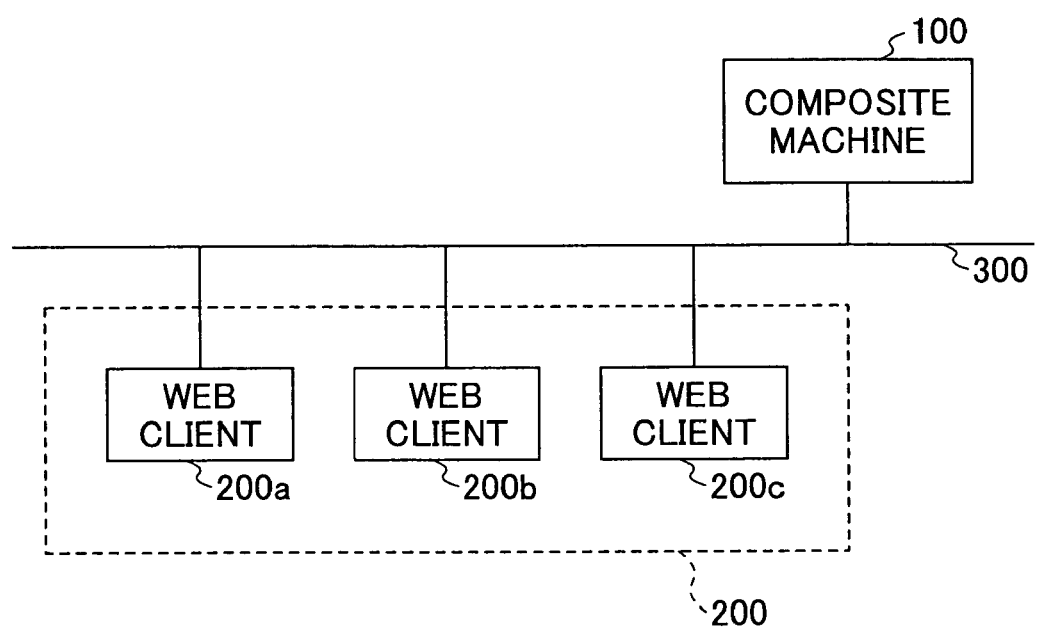
FIG. 1 shows a network configuration including a composite machine according to each embodiment of the present invention.

FIG. 1 shows a network configuration in which an image processing apparatus (referred to as a "composite machine" hereinafter) according to a first embodiment of the present invention is applied. In an image processing system shown in FIG. 1, the composite machine 100 according to the first embodiment of the present invention, an Web client 200a, an Web client 200b, an Web client 200c. (generically referred to as "Web clients 200", hereafter.), etc. are connected through a communication network 300, such as a LAN (Local Area Network), an intranet, or the Internet.

The composite machine 100 performs printing of document data, processing of facsimile transmission, etc. according to instructions coming from the Web client 200. Moreover, the composite machine 100 transmits a Web page which displays information requested in an HTTP request to the Web client 200 in response to the HTTP request coming from the Web client 200. For example, when a user of the Web client 200 requests status information concerning the composite machine 100 from a Web browser, the composite machine 100 transmits the HTML (HyperText Markup Language) data which indicates the status information to the Web client 200.

The composite machine 100 according to the first embodiment of the present invention which may be applied to the above-mentioned system has the following features:

After the shipment of the composite machine; a third party, such as a user or a third vendor may create an external application, which is then installed into a hard disk drive (HDD) of the composite machine which is a large-capacity storage device with a predetermined installer, and then, an external application starting part of the composite machine starts the thus-installed external application from the HDD after a predetermined diagnosis is performed on the HDD.

Figure 2:
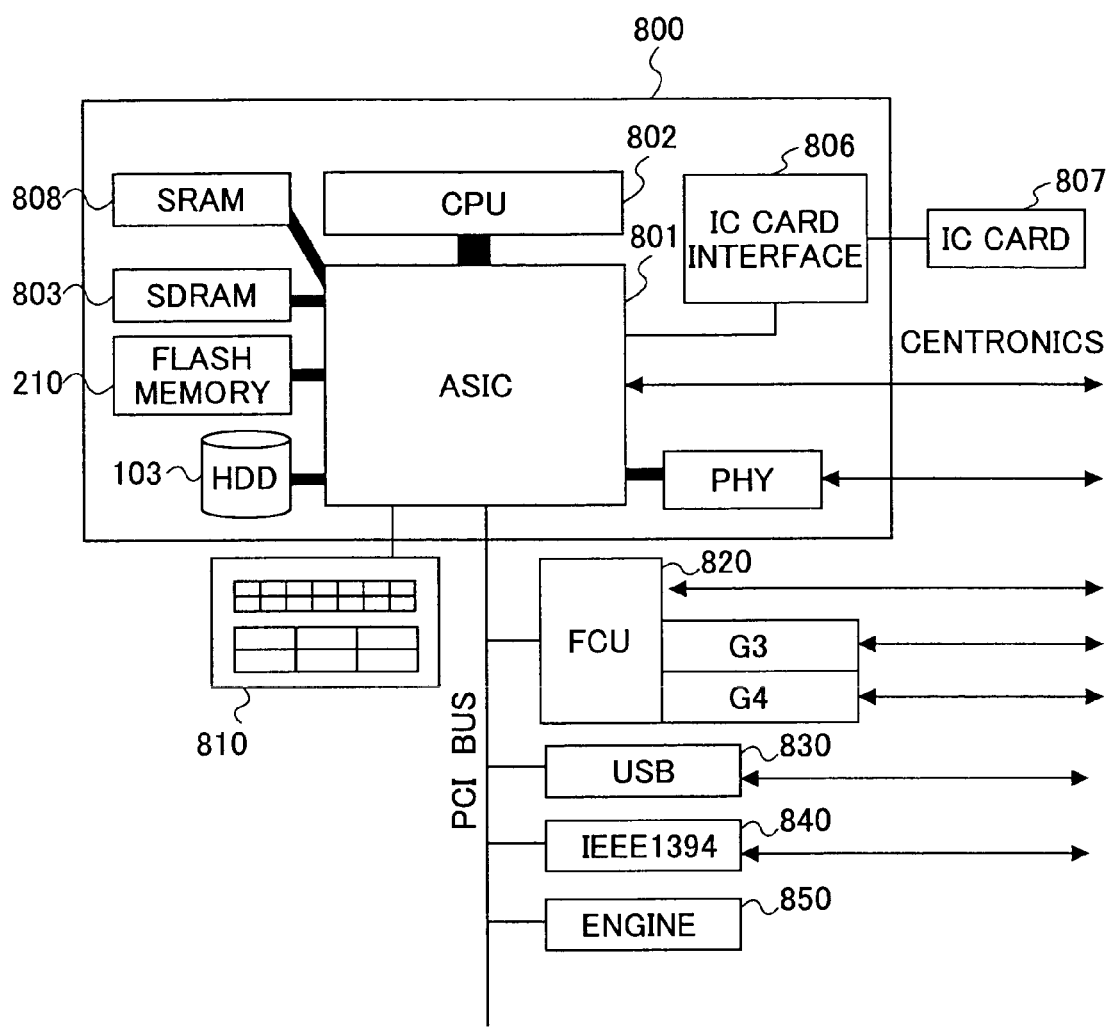
FIG. 2 shows a hardware configuration of the composite machine according to the first embodiment of the present invention.

FIG. 2 shows a hardware configuration figure of this composite machine 100 according to the first embodiment of the present invention. As shown in this figure, this composite machine includes a controller board 800 in which a CPU 802, an SDRAM 803, an SRAM 808, a flash memory (flash ROM) 210, an integrated circuit card (or IC card) interface part 806, and a HDD 103, which are connected to an ASIC 801 there. The composite machine 100 also includes an operation panel 810, a fax control unit (FCU) 820, an USB 830 and an IEEE1394 840, and an engine 850.

The operation panel 810 is directly connected to the ASIC 801. On the other hand, the FCU 820, USB 830 and IEEE1394 840 and engine 850 are connected to the ASIC 801 via a PCI bus.

The flash memory 210 stores starting permission data 211 and a configuration file 212, shown in FIG. 4, as will be described later. Furthermore, in the flash memory 210, various sorts of programs such as a general-purpose OS 121, control services and existing applications 130 such as a printer application 111, a copy application, and so forth are stored, shown in FIG. 3, and described later.

The integrated circuit card interface part 806 is an interface for an integrated circuit card (or IC card) 807 to be inserted thereto, and data exchange with this integrated circuit card 807 is performed therethrough. The integrated circuit card 807 can also be used as a recording medium for installation of external applications as will be described later. In this case, a newly developed/created external application 117 is previously stored in the integrated circuit card 807. And then, this external application 117 is read out from the integrated circuit card 807 by the function of the installer 118 shown in FIG. 3, and is installed into the HDD 103 thereby.

Operation described below is performed in the composite machine 100 according to the first embodiment of the present invention. That is, diagnostic processing for the HDD 103 is carried out. Then, when no problem is found out as a result of the diagnostic processing, the external applications 117 beforehand stored in the HDD 103 are started by the function of the external application starting part 131. Thus, since the diagnoses is performed beforehand, although the HDD 103 is used as a storage area for the external application 117, which may be not sufficiently reliable by itself as mentioned above, the reliability of the composite machine 100 is maintained.

Moreover, since starting of the external applications 117 from the HDD 103 is attained in this way, the external applications 117 can be arbitrarily inserted after the shipment of the composite machine 100 using the function of the HDD 103. After starting these applications 117 from the HDD 103, it becomes possible to achieve various new functions in the composite machine 100 thanks to these new application programs.

Moreover, in the composite machine 100 according to the first embodiment of the present invention, the validity of a license key set on each external application 117 is checked by a function of the external application starting part 131. And, when the license key is confirmed as being valid as a result, the relevant external application 117 is started. Consequently, the security/copy right of the external application 117 can be improved.

Moreover, diagnosis of the hard disk drive unit (HDD) according to the first embodiment of the present invention should be one for determining whether or not any failure occurs such that the external applications stored there can not be started properly. That is, this diagnosis may include an inspection for a physical defect in the hard disk drive unit, whether or not the consistency in the relevant file system is properly established, for example. However, it is not necessary to be limited to this manner.

In the composite machine 100 in the present embodiment, the diagnostic part 132 performs the above-mentioned diagnostic processing for the HDD 103. However, the diagnostic processing for the HDD 103 may be performed by another part, for example, by the external application starting part 131, instead.

Next, with reference to a block diagram of FIG. 3, functions of the above-mentioned composite machine 100 will be described in detail. As shown in this figure, the composite machine 100 has hardware resources 104, such as a monochrome line printer (B&W LP) 101, a color line printer (Color LP gas) 102, the above-mentioned hard disk drive unit (HDD) 103, a scanner, a facsimile, memories and a network interface. Further, the composite machine 100 includes a software group 110 containing the platform 120, various applications 130, a composite machine initialization part 129, the diagnostic part 132, and the external application starting part 131.

The above-mentioned monochrome line printer (B&W LP gas) 101, the color line printer (Color LP gas) 102, the scanner and the facsimile correspond to the engine 850 shown in FIG. 2. As mentioned above, each program of these applications 130, other than the external applications 117, such as the printer application 111, the copy application 112, the fax application 113, the scanner application 114, the network file application 115, the process inspection application 116, the installer 118, and the platform 120 are stored in the flash memory 210 shown in FIG. 2 at the time of shipment of the composite machine 100. Then, as will be described below, they are read out from the flash memory 210 by the CPU 802 at a time of actual operation of the composite machine 100, and is spread into the SDRAM 803 which can be accessed by the CPU 802 at high speed. And after that, they are read out from the SDRAM 803 by the CPU 802, and are executed by the same if needed.

The external application starting part 131 starts the external applications 117 installed in the HDD 103 after it is determined that a result of the diagnoses performed on the HDD 103 indicates no problem. The composite machine initialization part 129 is a process first started by the general-purpose OS 121, and performs starting of the control services, starting of applications 130 (except for the external applications 117), the diagnostic part 132, and the external application starting part 131.

The diagnostic part 132 diagnoses for a physical defect in the HDD 103, the consistency in the file system produced in the HDD 103, etc., and transmits a diagnostic result to the external application starting part 131 via communications in a process of message transmission or so. In the composite machines 100 in the present embodiment, the diagnostic part 132 performs diagnosing of the HDD 103, and, in addition, may further perform diagnosis of another recording medium, such as a SD memory card (IC card 807), or so.

The platform 120 includes: the control services which performs a management of the control services with interpreting processing instructions coming from the applications and generates acquisition instructions for the hardware resources; a system resource manager (SRM) 123 which arbitrates the acquisition instructions coming from the control service; and the general-purpose OS 121.

Figure 3:
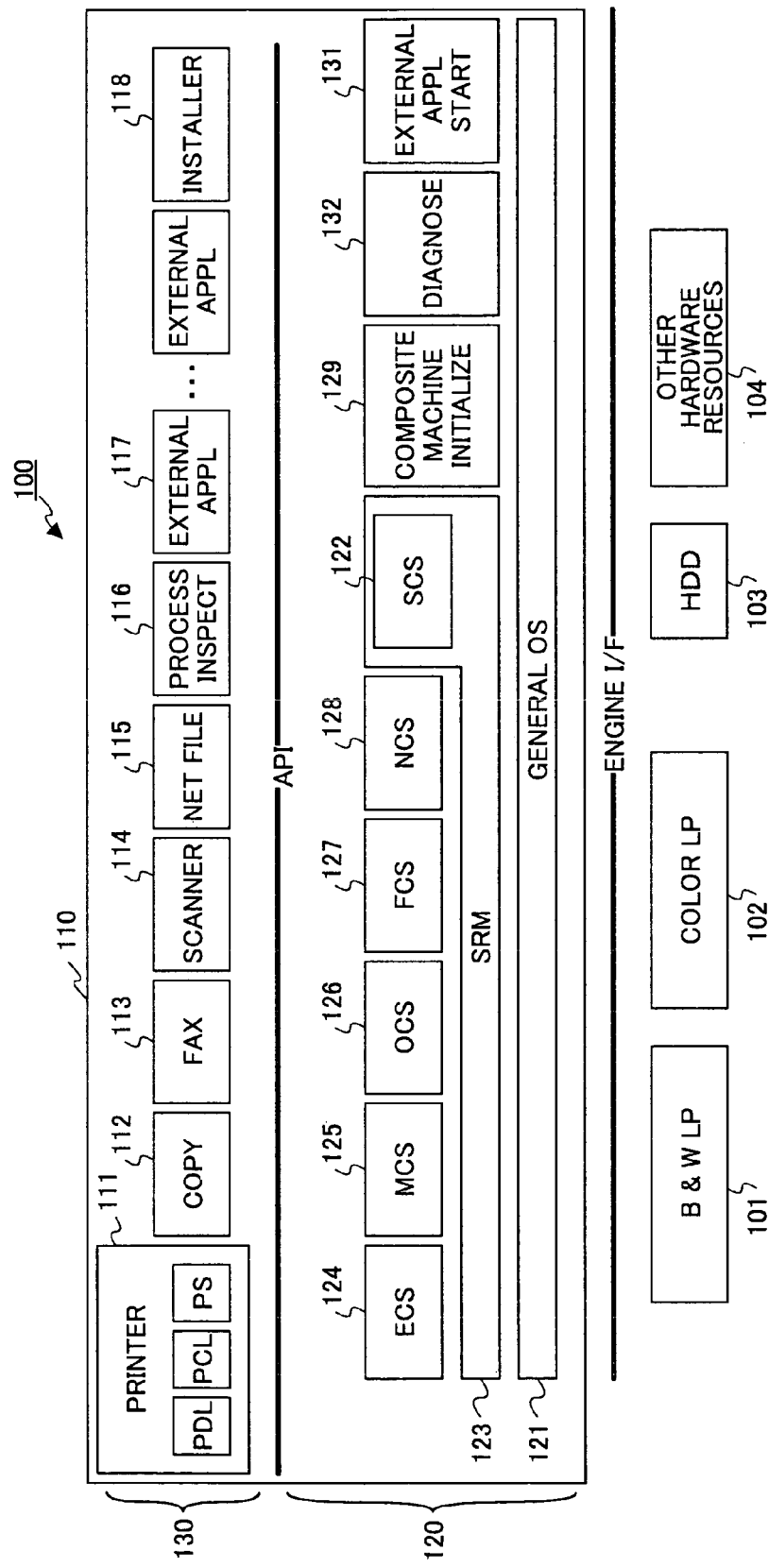
FIG. 3 is a block diagram showing a functional configuration of the composite machine according to the first embodiment of the present invention.

These control services include service modules, and includes an SCS (system control service) 122, an ECS (engine control service) 124, an MCS (memory control service) 125, an OCS (operation panel control service) 126, an FCS (facsimile control service) 127, and an NCS (network control service) 128, as shown in FIG. 3. The platform 120 also includes an application program interface (API) which makes it possible to receive processing instructions from the applications 130 via previously defined functions.

The general-purpose OS 121 is a general-purpose operating system, such as a UNIX (registered trademark), and executes each software of the platform 120 and applications 130 in parallel for a respective process. The process of the SRM 123 performs control of the system and management of the resources with the SCS 122. That is, the process of the SRM 123 performs execution control in response to instructions from an upper layer which requests to use the hardware resources, such as the engine such as the above-mentioned scanner part, printer part or so, the memory, HDD, host I/O (centronics I/F, network I/F, IEEE1394 I/F, RS232 C I/F, etc.), via a necessary arbitration.

Specifically, the SRM 123 determines whether or not the hardware resource which is requested is usable (that is, whether or not the hardware resource is currently used by another request), and, when it is usable, notifies this matter to the upper layer. The SRM 123 performs a usage scheduling for the hardware resources in response to the instructions from the upper layer, and carries out the contents of the instructions (i.e., paper conveyance, imaging operation, memory reservation, file generation, etc. for example, via the printer engine, for example) directly. The process of the SCS 122 performs application management, operation part control, system data display, LED display, resource management, interruption application control, etc.

The process of the ECS 124 controls the engines of the hardware resources 103, such as the monochrome line printer (B&W LP gas) 101, the color line printer (color LP gas) 102, the scanner, and the facsimile device.

The process of the MCS 125 performs acquisition of an image memory and releasing of the same, a use of the hard disk drive unit (HDD), and compression/decompression of image data.

The process of the FCS 127 provides the API which performs facsimile transmission/reception using a PSTN/ISDN network, to/from each application layer of the system controller, registration/quotation of various facsimile data managed by a BKM (backup SRAM), facsimile reading, facsimile reception and printing, and combined transmission and reception.

The process of the NCS 128 is a process for providing a service which can be used in common to applications which need the network I/O, distributes data received by each protocol from the network to each application, or acts as an agency at a time of transmitting data to the network from the application. Specifically, it has server demons, such as ftpd, httpd, lpd, snmpd, telnetd, and smtpd, client functions for these protocols, etc.

The process of the OCS 126 performs a control concerning the operation panel 810 which acts as an interface between an operator (user) and the main control part of the composite machine 100. The OCS 126 has a function of an OCS process, and a function of an OCS library. From the operation panel, the OCS process acquires an operation of pressing a key as a key event, and issues a key event function corresponding to the acquired key event to the SCS 122. In the OCS library, functions for displaying various information on a display screen of the composite machine 100 in response to requests from applications 130 or the control services, other functions for performing control concerning the operation panel. This OCS library is mounted to be linked with each module of the applications 130 and control services. All of these functions of the OCS 126 may be achieved by processes, or may be achieved in a form of the OCS library.

The applications 130 include various applications as mentioned above. That is, there are the printer application 111 which is an application for a printer function which has a page description language (PDL), a PCL, and a PostScript (PS); the copy application 112 which is an application for a copying function; the fax (facsimile) application 113 which is an application for a facsimile function; the scanner application 114 which is an application for an image scanning function; the network file application 115 which is an application for a network file; and the process inspection application 116 which is an application for a process inspection.

Each process of these applications 130 and each process of the above-mentioned control services perform inter-process communications with function calls, return value transmission therefor, and transmission and reception of various messages. Thus, various user services concerning image formation processing such as a copy operation, a printer operation, a scanner operation, a facsimile operation, etc. are achieved efficiently.

Thus, in the composite machine 100 according to the first embodiment of the present invention, the plurality of applications 130 and plurality of control services operate as respective processes. In each of these processes, one or a plurality of threads are created, and a parallel execution is performed in respective units of the threads. The control services provide common services to the applications 130. For this reason, these processes perform parallel operation.

Parallel operation of the threads are also performed. Then, inter-process communications are performed therebetween, necessary cooperation is achieved therebetween, and, thus, the user services concerning image formation processing such as copy operation, printer operation, scanner operation, facsimile operation, etc. are provided, performing communications between processes mutually and carrying out cooperation operation.

In the composite machine 100, a third person such as a customer or a third vendor may create the above-mentioned external applications 117, which are then inserted into the application layer provided above the above-mentioned control service layer. FIG. 3 illustrates an example in which the external applications 117 are thus inserted.

In the composite machine 100 according to the first embodiment of the present invention, the processes of the plurality of applications 130 and the processes of the plurality of control services operate in cooperation. However, other than such a manner of operation, it is also possible that each of the applications 130 and each of the control services operate independently instead. Moreover, any of the applications 130 may be added or removed one by one if necessary.

The installer 118 has a function of installing in the HDD 103 the external applications 117 which a third person created, for example, as mentioned above. In the composite machine 100 according to the present embodiment, the external applications 117 stored in a recording medium, such as an integrated circuit (IC) card (such as the IC card 807 shown in FIG. 2), are read out by the installer 118, and are installed in the HDD 103 by the installer 118 as will be described later. The external applications 117 are then started from the HDD 103 by the external application starting part 131, and they operate in the application layer.

On the other hand, in the applications 130, there are provided simultaneously at the time of shipment of the composite machine 100, the printer application 111, the copy application 112, the fax application 113, the scanner application 114, the network file application 115, the process inspection application 116, each control service, the diagnostic part 132, the external application starting part 131, and so forth, which are stored in the flash memory 210 at the time of shipment as mentioned above. Then, the composite machine initialization part 129 starts them at a time of starting of the composite machine 100 (at a time of power supply starting).

A configuration of the external application starting part 131 will now be described. FIG. 4 is a block diagram showing a functional configuration of the external application starting part 131 of the composite machine 100 according to the present embodiment. The external application starting part 131 includes an initialization part 201, an option analysis part 202, a diagnostic result communication part 203, a flash memory management part 204, a starting settling processing part 205, an application description processing part 206, a license check part 207, and an application starting part 208, as shown in FIG. 4.

Furthermore, the external application(s) 117, a starting setting file 221 in which data which specifies the external application(s) 117 to be started from the HDD 103, and application description file(s) 222 in which various information on the external application(s) 117 is set are stored in the HDD 103. Thus, according to the present embodiment, both the starting setting file 221 and the application description file(s) 222 are stored in the HDD 103. However, it is also possible that they may be instead stored in the flash memory 210 or another recording medium.

The starting permission data 211 in which information indicating whether or not starting from the HDD 103 of the external applications 117 is permitted is stored in the flash memory 210. When starting from the HDD 103 of the external applications 117 is permitted, the matter that "it is valid" is indicated by the starting permission data 211, while "it is invalid" is set in the same otherwise. This starting permission data may be set from a predetermined initial setting window displayed on the operation panel 810 (see FIG. 15).

The above-mentioned data and files are stored in the flash memory 210 according to the present embodiment as mentioned above. However, it is also possible that, any other recording medium may be used for the same purpose as long as it is a non-volatile memory.

Moreover, a configuration file 212 is stored in the flash memory 210. In this configuration file 212, software programs which should be started are set previously, from among the existing applications 130 which are previously incorporated in the composite machine 100 such as the control services, the printer application 111, the copy application 112 and so forth. At a time of a power supply starting in the composite machine 100, the composite machine initialization part 129 reads this configuration file, and starts the existing applications 130 such as the control services, the printer application 111, the copy application 112 and so forth which are previously incorporated in the machine 100, according to the contents set in the configuration file 129.

The initialization part 201 of the external application starting part 131 performs initialization processing on the external application starting part 131. In case the external application starting part 131 is started by the composite machine initialization part 129, the option analysis part 202 analyzes option parameters of commands specified there. The diagnostic result communication part 203 waits for a finish of a diagnosis performed on the HDD 103 by the diagnostic part 132, and receives the diagnostic result in a message of inter-process communication or so. The diagnostic result communication part 203 determines the state of the HDD 103 from the thus-received diagnostic result.

The flash memory management part 204 reads data or contents set in files which are stored in the flash memory 210, or writes the same thereto. Specifically, the flash memory management part 204 reads the starting permission data 211, and determines whether or not the external applications 117 should be started from the HDD 103 therefrom. The starting setting processing part 205 reads the starting setting file 221 stored in the HDD 103, and performs an analysis processing. The application description processing part 206 reads the application description files 222 stored in the HDD 103, and performs the analysis processing thereon. The license check part 207 determines whether not the license key set in each of the application description files 222 is valid.

The application starting part 208 starts the external applications 117 stored in the HDD 103. At this time, the application starting part 208 starts the external applications 117 by issuing execution commands set in the application description files 222.

Next, the contents of the starting setting file 221 stored in the HDD 103 will be described. The starting setting file 221 is used as starting setting information. A list of program names of the external applications 117 installed in the HDD 103 is described in the starting setting file 221. Each time when the external application 117 is installed in the HDD 103 by the installer 118 (externally as will be described later), the name of the program of the external application 117 installed is added in a form of 'program name' and 'program file name of external application' in the stated order in the above-mentioned list.

FIG. 5 is a diagram showing an example of the contents of the above-mentioned starting setting file 221. The program file names managed in the file system created in the HDD 103 are described as 'program file names of external application', in the application description file shown. That is, for example, it is described as 'xx.xxx.sample', 'yy.yy.test', . . . , as shown. These program names should be those unique in the relevant composite machine 100.

Next, the contents of the application description files 222 stored in the HDD 103 will be described. The application description file 222 is provided for each external application 117, and describes attribute information concerning the program of the external application 117. The application description file 222 is previously stored in a recording medium such as an IC card or PC card together with the relevant external application 117, and is then written in the HDD 103 together with the external application 117 at a time of installation of the external application 117 in the HDD 103. Therefore, when a plurality of external applications 117 are stored in the HDD 103, the respective application description files 222 are also stored there accordingly.

FIG. 6 is a diagram showing an example of the contents of the application description file 222. As shown in FIG. 6, respective items of program name, display name, version, vendor name, execution command, installation media number, installation media total, installed installation media total, installation time, and license key are set in each application description file 222. These items of program name, display name, version, vendor name, and execution command are set by a creator of the relevant external application 117 at a time of storing of the external application 117 to the recording medium used for installation of the external application 117.

The item of program name shows a program name of the relevant external application, and this program name is applied as a program name in the starting setting file 221 after installation.

The item of display name is a display name of the relevant external application 117, and, at a time of installation of the external application 117 by the installer 118, or at a time of starting of the external application 117 by the external application starting part 131, this display name is displayed on the display part (screen) of the operation panel 810.

The item of version is a character sequence which shows version information of the relevant external application 117. This version information is displayed on the display part of the operation panel 810 at a time of installation of the external application 117 by the installer 118, or at a time of starting of the external application 117 by the external application starting part 131.

The item of vendor name is a character sequence showing a vendor name of a vender who created the relevant external application 117. This vendor name is displayed on the display part of the operation panel 810 at a time of installation of the external application 117 by the installer 118, or at a time of starting of the external application 117 by the external application starting part 131.

The item of execution command specifies a command for execution of the external application 117 with a relative path applied. When required, a command line option can also be specified there. The command set there is executed by the external application starting part 131.

The item of installation medium number shows the serial number of the relevant recording medium in case the relevant external application 117 is recorded into a plurality of recording media for installation as divisions. In case where only one sheet of recording medium is used, 0 is specified there. The item of installation medium number is displayed on the display part of the operation panel 810 at a time of installation of the external application 117 by the installer 118.

The item of installation media total shows the total number of these recording media in the case where the relevant external application is recorded into the plurality of sheets of recording medium for installation as divisions as mentioned above. In case where only one sheet of recording medium is used, 0 is specified there. The item of installation media number is displayed on the display part of the operation panel 810 at a time of installation of the external application 117 by the installer 118.

The item of installed installation media total specifies the total number of installed installation media. This number is the total number of recording media for which installation of the external application has been already finished.

The item of installation time shows a time at which the installation is performed. This is displayed on a user interface (window) of the installer 118.

The item of license key specifies the above-mentioned license key of the external application 117. This item of license key includes a character sequence input by the user at a time of installation of the external application.

Next, starting processing performed by installer 118 in the composite machine 100 according to the present embodiment described above will be described. The starting processing of the installer 118 is performed by the composite machine initialization part 129.

Figure 4:
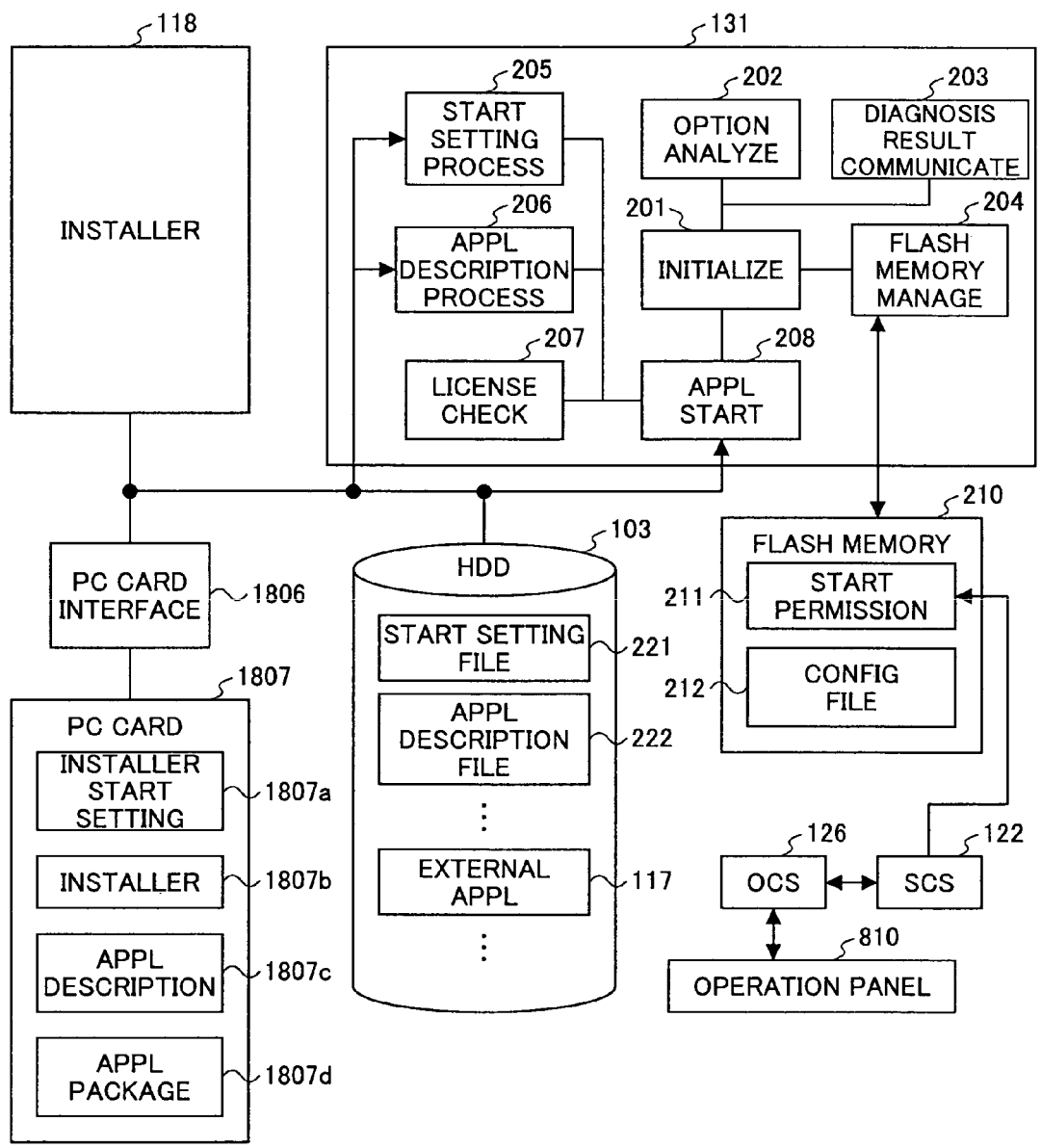
FIG. 4 is a block diagram showing a functional configuration of an external application starting part of the composite machine according to the first embodiment of the present invention.
Figure 7:
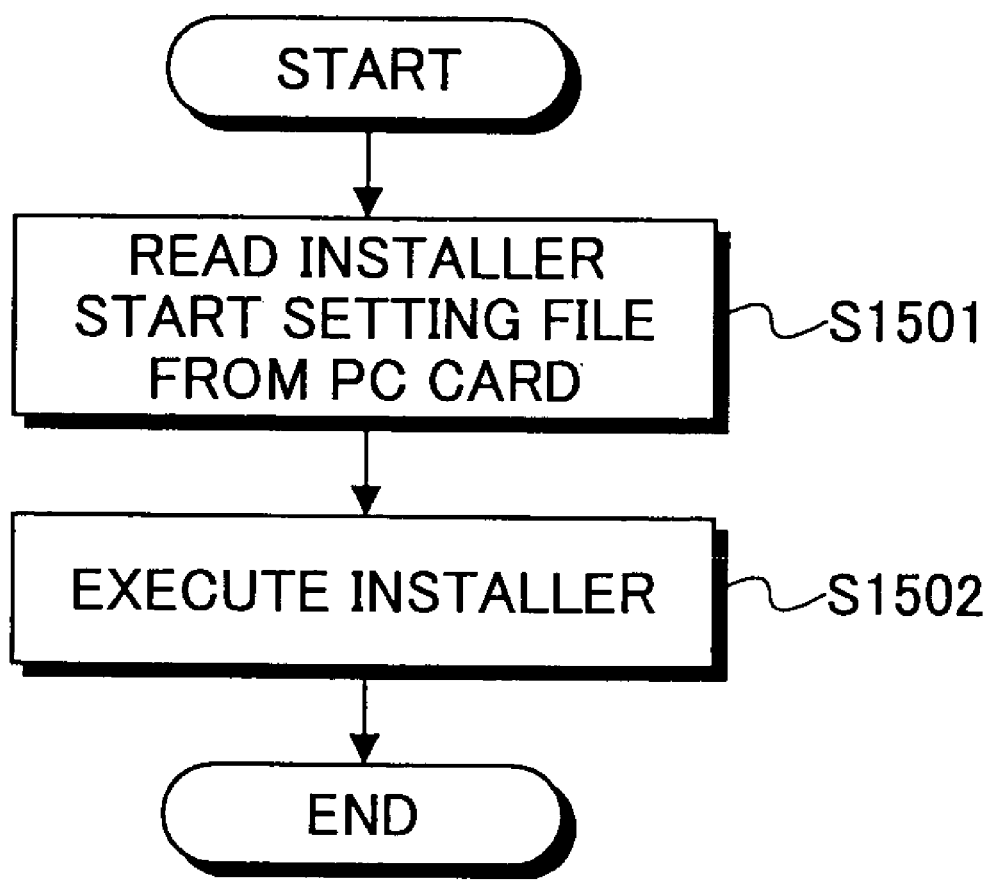
FIG. 7 is an operation flow chart which shows a procedure of starting processing of an installer of the composite machine according to the first embodiment of the present invention.

For the purpose of installation operation, a PC card interface part 1806 is provided as shown in FIG. 4. However, it is also possible that the IC card interface 806 show in FIG. 2 may be used for the same purpose via the IC card 807 which may be used as a recording medium for the installation operation. FIG. 7 is a flow chart which shows a procedure of the starting processing of the installer 118.

First, a user inserts the PC card 1807 (see FIG. 4) in which the relevant external applications are recorded is inserted into the above-mentioned PC card interface part 1806, and the power supply is started in the composite machine 100. After the power supply is started in the composite machine 100, first, initialization of the hardware resources and diagnosis of the controller board are performed by a predetermined program called ROM monitor (not shown). After that, the general-purpose OS 121 is started. Then, the ROM monitor starts the composite machine initialization part 129 on the general-purpose OS 121. This composite machine initialization part 129 acts as a process first started on the general-purpose OS 121.

The thus-started composite machine initialization part 129 reads an installer starting setting file 1807a (see FIG. 4) from the above-mentioned PC card 1807 (in Step S1501). Then, an installer 1807b in the PC card 1807 is started as an installer starting command described in the installer starting setting file 1807a is executed (in Step S1502). As the installer 1807b in the PC card 1807 is thus started, a process of the installer 118 is thus produced in the application layer as shown in FIGS. 3 and 4.

Figure 8:
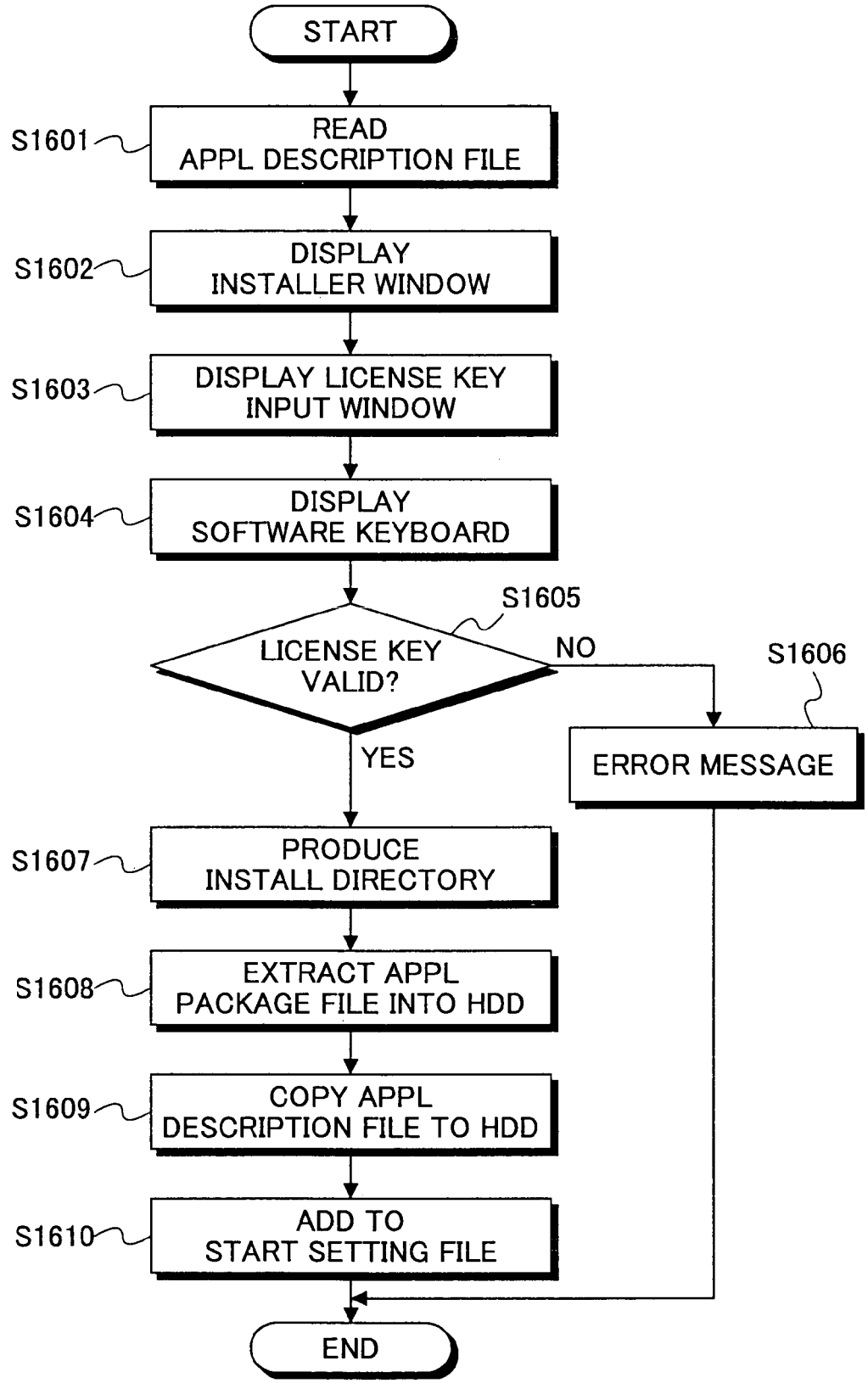
FIG. 8 is an operation flow chart which shows a procedure of installation processing by the installer of the composite machine according to the first embodiment of the present invention.

Next, installation processing performed by the installer 118 started by the composite machine initialization part 129 as mentioned above will be described. FIG. 8 is a flow chart which shows the procedure of installation processing for the external application 117.

First, the installer 118 reads application description files, after analyzing option parameters at the time of inputting of the above-mentioned command (in Step S1601). The application description files thus read include both application description files 1807c stored in the PC card 1807 and the application description files 222 stored in the HDD 103.

Then, the installer 118 analyzes the contents of each of these application description files, and acquires attribute information of the external application 117 already installed in the HDD 103, from the contents of the application description file 222. Thus, the attribute information of each of the external applications 117 to be installed and the external applications 117 currently being installed are obtained from the contents of application description files 1807c of the PC card 1807. Then, a predetermined installer window which shows the contents of the attribute information is displayed on the operation display part of the operation panel 810 (in Step S1602).

FIG. 9 shows a diagram showing an example of this installer window. As shown, in the installer window, there are displayed, for the external applications to be then installed, application names, versions, vendor names, and numbers of installation media read out from the application description files. Moreover, for the applications already installed, application names, versions, installation dates, and vendor names are read out from the application description file and displayed in the installer window. Moreover, when the installation is finished properly, a display of "OK" is made in a state field of the window. On the other hand, for the external application under installation, the installation medium number is displayed in the same state field.

When a touch operation on an installation button is performed by an operator in the installer window shown in FIG. 9, a key event is acquired by the installer 118. And then, the installer 118 displays a license key input window on the operation display part of the operation panel 810 (in Step S1603), and displays a software keyboard there for a license key to be input by the operator (in Step S1604).

Figure 10:
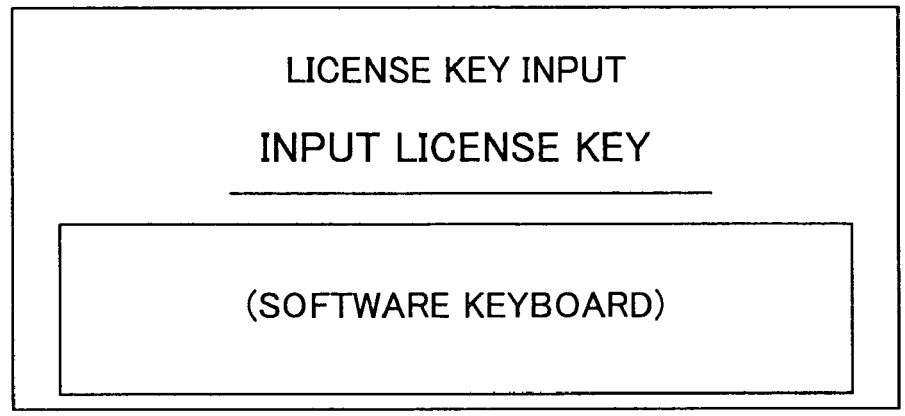
FIG. 10 shows an example of a license key input window displayed on the composite machine according to the first embodiment of the present invention.
Figure 11:
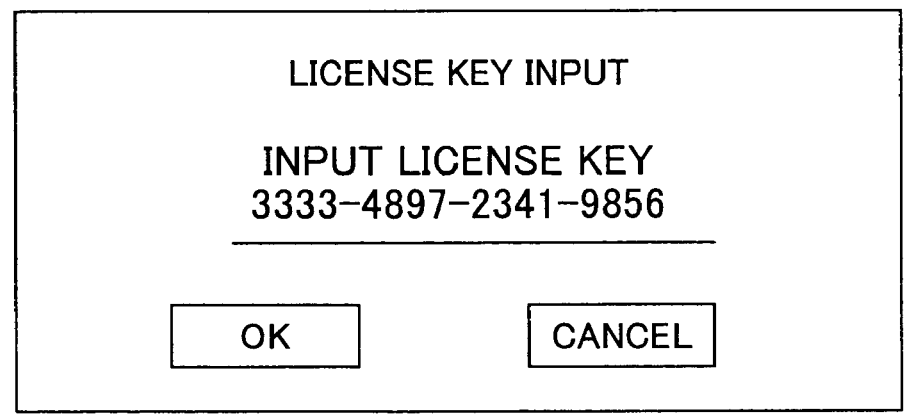
FIG. 11 shows an example of input information in the license key input window shown in FIG. 10.

FIG. 10 is a diagram showing an example of this license key input window. Via this license key input window, the operator inputs a license key for the relevant exterior application 117. FIG. 11 is a diagram showing an example of the license key input screen in a state where the license key has been thus input by the operator.

The license key is input on the license key input screen as shown in FIG. 11. Furthermore, a determination is made on the thus-input license key as to whether or not it is valid by the installer 118 after an OK button is pressed. This determination is made by a comparison between the thus-input license key and the same previously set in the application description files 1807c (in Step S1605). Then, when the determination is finished in failure (the input license key is not proved), an error message indicating this matter is displayed (in Step S1606), and the installation processing is finished in failure.

On the other hand, when the determination is finished in success (the license key is proved), the installer 118 produces an installation directory in the HDD 103 (in Step S1607). Furthermore, the installer 118 extracts an application package file 1807d from the PC card 1807, and copies the external applications 117 therefrom to the installation directory of the HDD 103 (in Step S1608).

Next, the installer 118 copies the application description files 1807c from the PC card 1807 to the HDD 103 (in Step S1609). Then, the installer 118 adds the file names of the external applications 117 thus installed in the starting setting files 221 of the HDD 103 (in Step S1610). The installation processing of the external applications 117 is thus completed. After that, thanks to the function of the external application starting part 131, the external applications 117 thus installed can be then started from the HDD 103.

Figure 12:
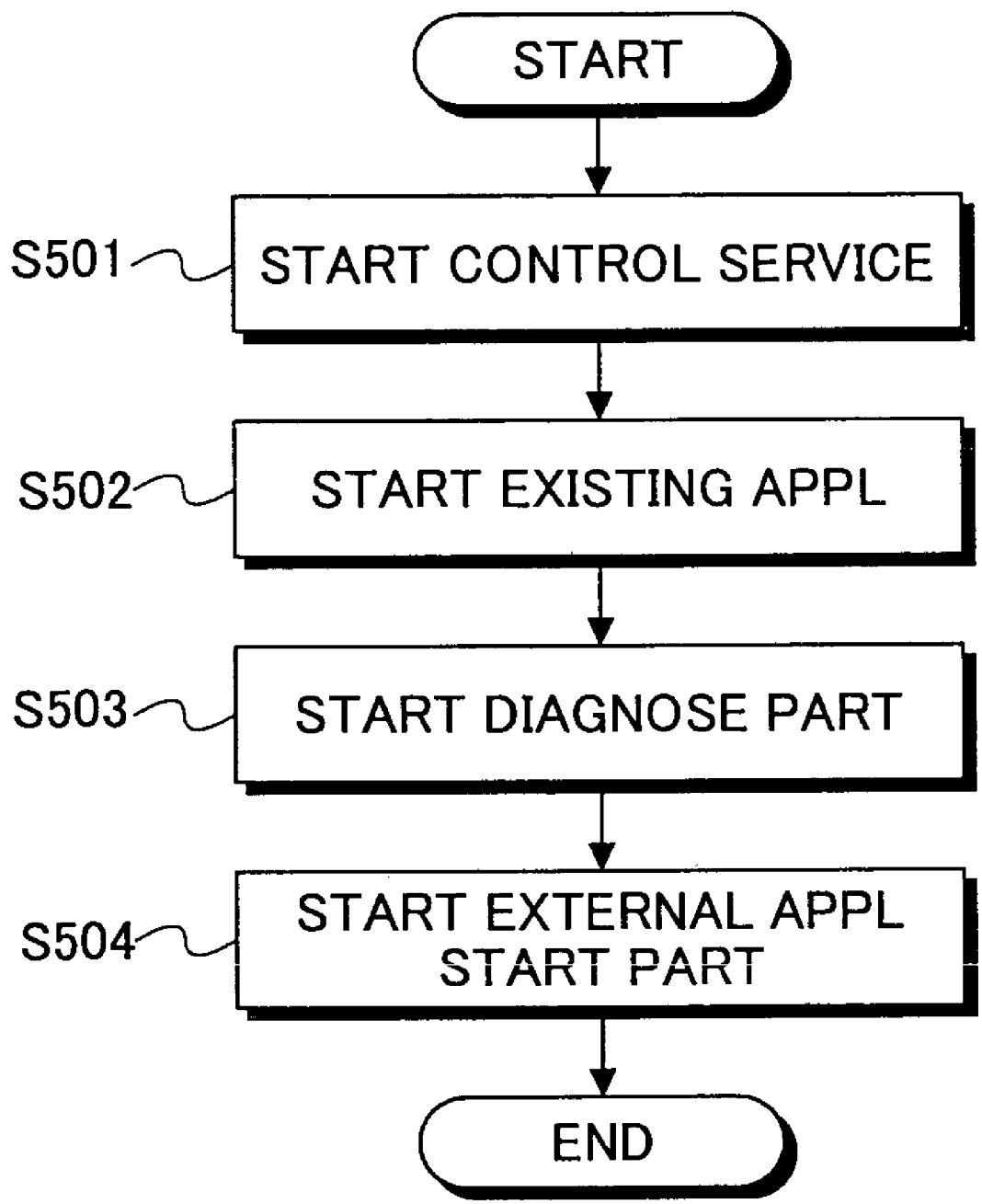
FIG. 12 is an operation flow chart which shows a procedure of initialization processing performed by a composite machine initialization part in the composite machine according to the first embodiment of the present invention.

Next, in the composite machine 100 of the present embodiment described above, initialization processing of the composite machine 100 which should be performed before starting of the external applications 117 will be described. FIG. 12 is a flow chart which shows a procedure of the initialization processing performed by the composite machine initialization part 129. After the power supply is started in the composite machine 100, initialization of the hardware resources and diagnosis of the controller board are first performed by the above-mentioned ROM monitor. Then, the general-purpose OS 121 starts. And the ROM monitor starts the composite machine initialization part 129 on the general-purpose OS 121. This composite machine initialization part 129 acts as a process first started on the general-purpose OS 121. The started composite machine initialization part 129 reads the configuration file 212 from the flash memory 210, and starts the control services, from the contents set in the configuration file 212 (in Step S501).

Next, according to the contents set in the configuration file 212, the existing applications such as the printer application 111, the copy application 112, the scanner application 114, the fax application 113, the network file application 116, and the process inspection application 116 which are previously incorporated in the machine 100 are started (in Step S502). And the diagnostic part 132 is started and diagnostic processing of the HDD 103 is performed (in Step S503). Thus, diagnostic processing for inspection for any physical defect of the HDD 103, inspection of the file system therein, etc. is started. Next, the external application starting part 131 is started (in Step S504).

Figure 13:
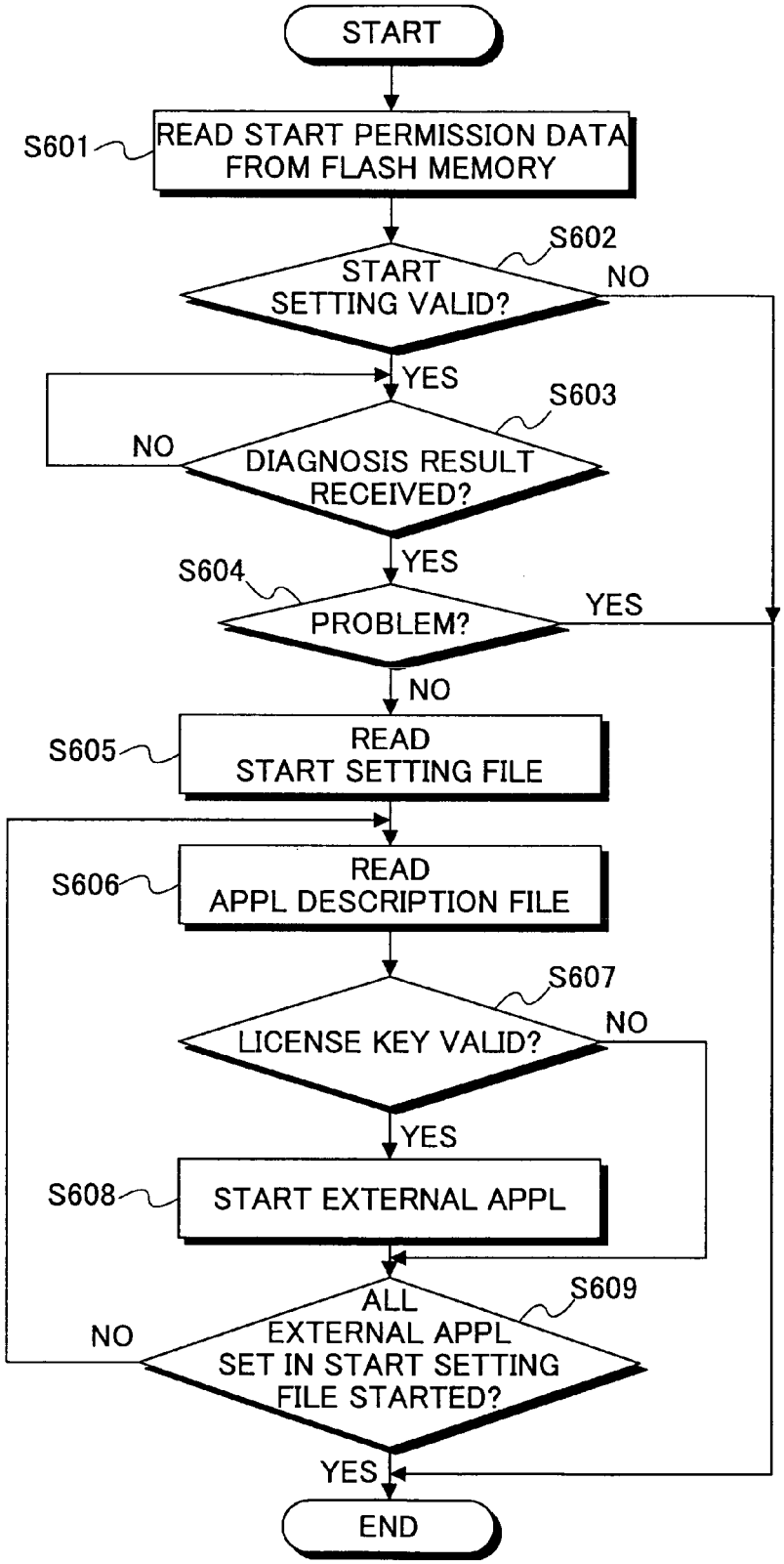
FIG. 13 is an operation flow chart which shows a procedure of external application starting processing performed by the external application starting part of the composite machine according to the first embodiment of the present invention.

Next, starting processing for the external applications 117 by the external application starting part 131 to be started by the composite machine initialization part 129 will be described. FIG. 13 is a flow chart which shows a procedure of starting processing of the external applications 117 by the external application starting part 131.

The external application starting part 131 reads the starting permission data 211 from the flash memory 210 first (in Step S601), and determines whether or not starting of the external application 117 from the HDD 103 is set valid there (in Step S602). When it is set invalid (No in Step S602), starting of the external application 117 is not performed, and the processing is terminated then (finished in failure).

On the other hand, when the starting permission data 211 has a setting that the starting is valid (Yes in Step S602), a state of waiting for a notice of a diagnostic result from the diagnostic part 132 is entered (Step S603). And when the diagnostic result is received from the diagnostic part 132 (Yes in Step S603), it is determined whether or not the diagnostic result indicates that a problem occurs (in Step S604). When the diagnostic result indicates an existence of problem (Yes in Step S604), an error message or so is output on the display part of the operation panel 810, and starting of the external application 117 is not performed.

On the other hand, when the diagnostic result indicates no problem (No in Step S604), in order to perform starting processing of the external applications 117 from the HDD 103, the starting setting file 221 is read from the HDD 103. And program names set in the starting setting file 221, i.e., program names of all the external applications 117 installed in the HDD 103, are acquired (in Step S605). Next, the application description file 222 of each of the external applications 117 having the program names thus acquired is read (Step S606).

And the license key set in the application description file 222 is examined, in this case, as to whether or not it is valid, i.e., for example, whether or not the validity date is already expired, whether or not another problem occurs there, or so (in Step S607). And when it is determined that the license key is valid as a result (Yes in Step S607), the external application 117 is then started from the HDD 103 (in Step S608). At this time, the application starting part 308 of the external application starting part 131 starts the external application by issuing an execution command previously set in the relevant application description file 222.

On the other hand, when it is determined that the license key is not valid (No in Step S607), starting of the external application 117 from the HDD 103 is not performed. Then, an error message indicating this matter may be output to the display part of the operation panel 810.

Processing from the above-mentioned steps S606 to S608 is repeatedly performed for each of all the external applications 117 set in the starting setting file 221 (in Step S609). Thereby, as shown in FIG. 3, all the external applications 117 installed in the HDD 103 are started, and are executed in the application layer.

The contents of the above-mentioned starting permission data 221 read at Step S601 may be set from the operation panel 810 of the composite machine 100 by a user. The initial setting window which may be used for this purpose is displayed on the operation panel 810, when a predetermined drawing function included in a function library which the OCS 126 has is called by the SCS 122.

Figure 15:
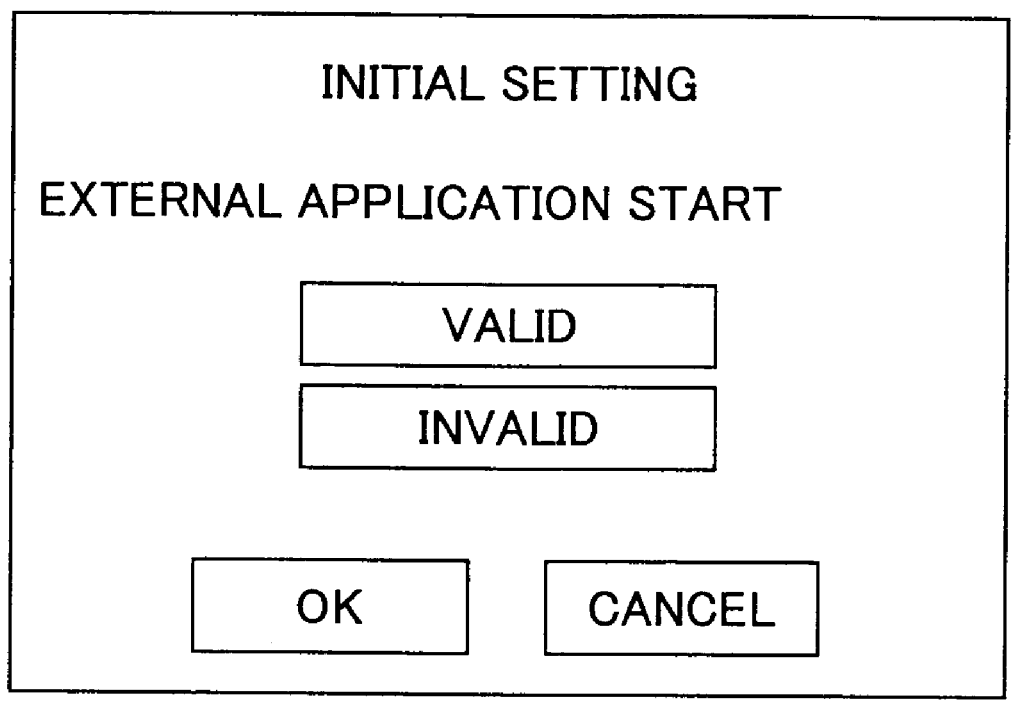
FIG. 15 is a diagram showing an example of an initial setting window in the composite machine according to the first embodiment of the present invention.

FIG. 15 is a diagram showing an example of the above-mentioned initial setting window. An operator sets information indicating whether or not the external applications are started, on the window shown in FIG. 15. That is, in the window of FIG. 15, if a touch operation by the operator on a button "VALID" is carried out, and a touch operation on an "OK" button is carried out, a relevant event is acquired by the OCS 126. And this event is notified to the flash memory management part 204 of the external application starting part 131 by the SCS 122. The flash memory management part 204 then updates the contents of the starting permission data 221 of the flash memory 210 into "valid".

On the other hand, on the window of FIG. 9, if a touch operation of "INVALID" is carried out and a touch operation of the "OK" button is carried out, the flash memory management part 204 updates the contents of the starting permission data 221 of the flash memory 210 in the same procedure into "invalid".

Figure 14:
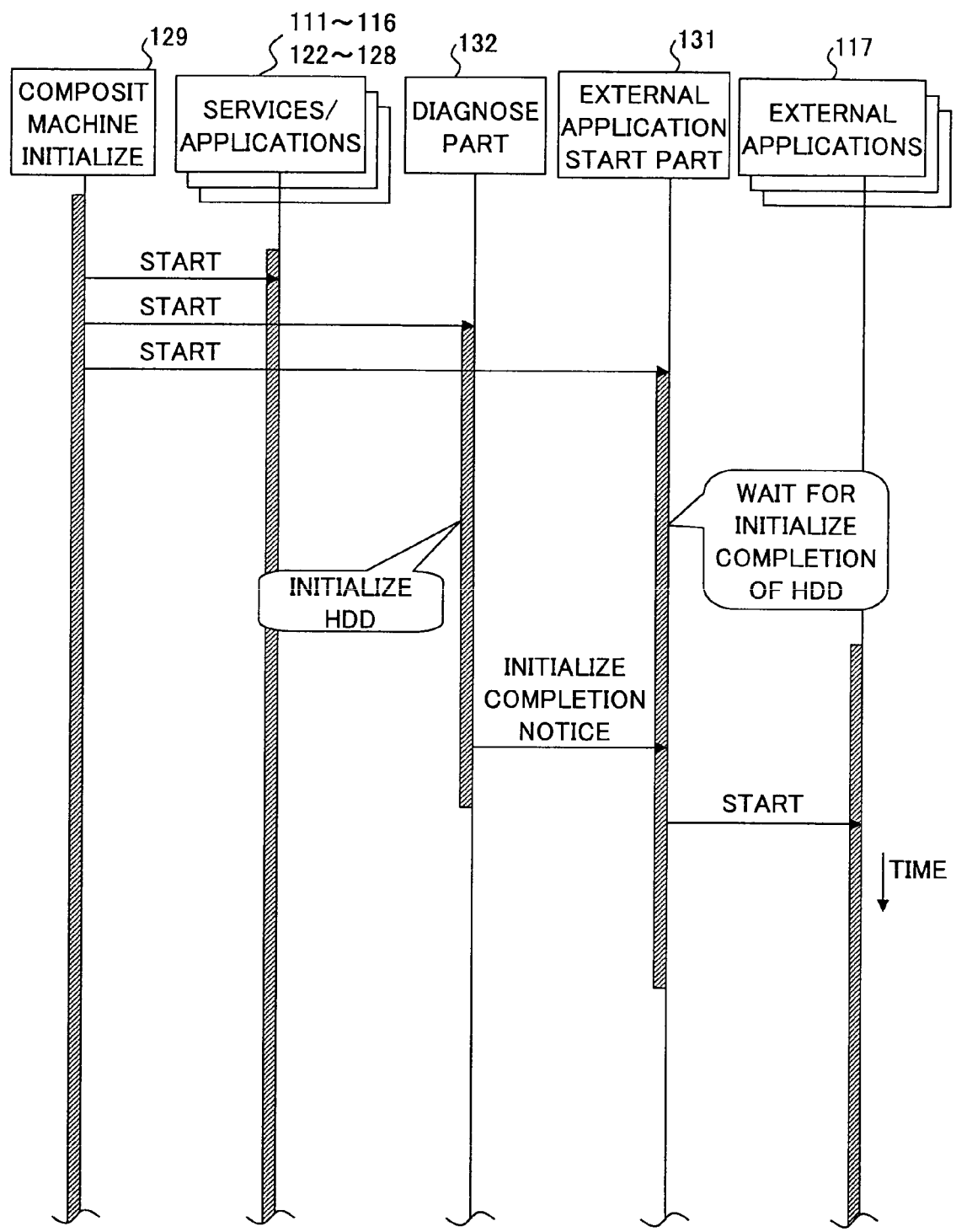
FIG. 14 shows a time chart at a starting stage on each module in the composite machine according to the first embodiment of the present invention.

FIG. 14 shows a time chart illustrating how each application module is started in the above-mentioned composite machine initialization processing. As shown in this figure, modules of various services/applications 111 through 116, 122 through 128, the diagnostic part 132, and the external application starting part 131 are started respectively by the composite machine initialization part 129. And the diagnostic part 132 carries out the diagnosis of the HDD 103 after being started, and, simultaneously or in parallel, the external application starting part 131 may perform a predetermined pre-processing needed for starting the external applications 117.

On the other hand, simultaneously or in parallel with the diagnostic processing by the above-mentioned diagnostic part 132, the programs stored in the flash memory 210, i.e., various services/applications 111 through 116, 122 through 128, stored, not in the HDD 103, but in the flash memory 210 are started independently from the above-mentioned diagnostic processing, and then, enter a state where each function thereof has become effective. Therefore, even during the diagnostic operation by the diagnostic part 132, a copy processing by the copy application 112, a fax transmitting processing by the fax application 113, etc., for example, can be performed simultaneously or in parallel independently from the diagnostic operation.

Then, when the diagnosis of the HDD 103 by the diagnostic part 132 is completed and a diagnostic result indicating no problem is obtained, this information is notified to the external application starting part 131 from the diagnostic part 132. The external application starting part 131 which has thus received this notice starts the external applications 117 stored in the HDD 103. As a result, respective services can be provided by the external applications 117.

Thus, according to the embodiment of the present invention, even during the diagnosis of the HDD 103 which stores the external applications 117, starting of the programs stored in the flash memory 210 can be performed separately and then provision of the standard services become available thereby after the starting thereof is achieved independently from the diagnostic operation. Therefore, while new functions are inserted thanks to the external applications 117 by using the HDD 103, a quick use of the standard functions of the existing applications stored in the flash memory 210 is available, without waiting for a completion of the diagnosis of the HDD 103. Therefore, effective improvement in user's convenience can be aimed at in the composite machine.

It is noted that the vertical axes in FIG. 14 correspond to the respective modules, and the portions hatched therealong indicate the time periods in which the respective modules are under operation.

A reason why such a diagnosis is needed for the HDD 103 will now be described. As well-known, a hard disk drive such as the HDD 103 have disks as magnetic recording media rotating therein at high speed, read-out/write-in of information therefrom/thereto is performed via read/write heads in this state. Therefore, as compared with other semiconductor memories or so, which do not have such mechanically movable parts, it is said that a possibility of failure in these mechanism portions becomes higher accordingly in general.

Furthermore, in a hard disk drive such as the HDD 103, generally speaking, a software called "file system" is used. An OS usually includes this file system, and it achieves a superior management function for relevant file structures at a time of recording/reproducing information on/from the HDD in data management of form of 'files'. Thanks to the various functions of this file system, significant improvement in user's convenience at a time of using the HDD even having a large storage capacity is achieved as well known. As a typical function of the file system, an asynchronous writing function using a cache memory may be cited, for example.

Namely, the asynchronous writing using cache memory is generally performed for storage control applying a HDD which generally has a relatively slow access speed as compared with semiconductor memory or so. Then, thanks to this asynchronous writing function, significant improvement in response time is achieved for a user thereby. For example, a home page entitled "Linux file system technical description" ('http://www.atmarkit.co.jp/flinux/index/indexfiles/linuxfs-index.html', Aug. 8, 2003) shows such functions of the file system, in particularly, a page entitled "At First Time, The Basic Technology on VFS and File System" ('http://www.at-markit.co.jp/flinux/rensai/fs01/fs01a.html', Aug. 8, 2003).

For achieving these functions, the file system creates management information such as a FAT (file allocation table) or so, and performs operations of information recording/reproduction according to the management information.

Namely, unlike in such a type of recording medium as that in which information is written therein in a simple manner according to a predetermined addresses in a predetermined sequence, information is not necessarily written in a predetermined sequence in case the information is recorded in an HDD. Therefore, it is necessary to manage recording addresses of information for each file by using the FAT or so. Then, in case a consistency between the actual recording addresses and those managed by the management information is broken by some cause, proper reading of the information may not be achieved. In order to avoid such a situation, it is necessary to perform a diagnosis operation before a program stored in the HDD is started therefrom as well-known.

As mentioned above, the composite machine 100 according to the first embodiment of the present invention performs the diagnostic processing on the HDD 103. And when the diagnostic result shows no problem, the external applications 117 installed in the HDD 103 are started. In addition to the HDD 103, the composite machine 100 may have another recording medium from which external applications may also be started. According to a second embodiment of the present invention which will be described now, the external applications 117 stored in an integrated circuit card (IC card or so), such as a flash card may also be started in a composite machine.

Figure 16:
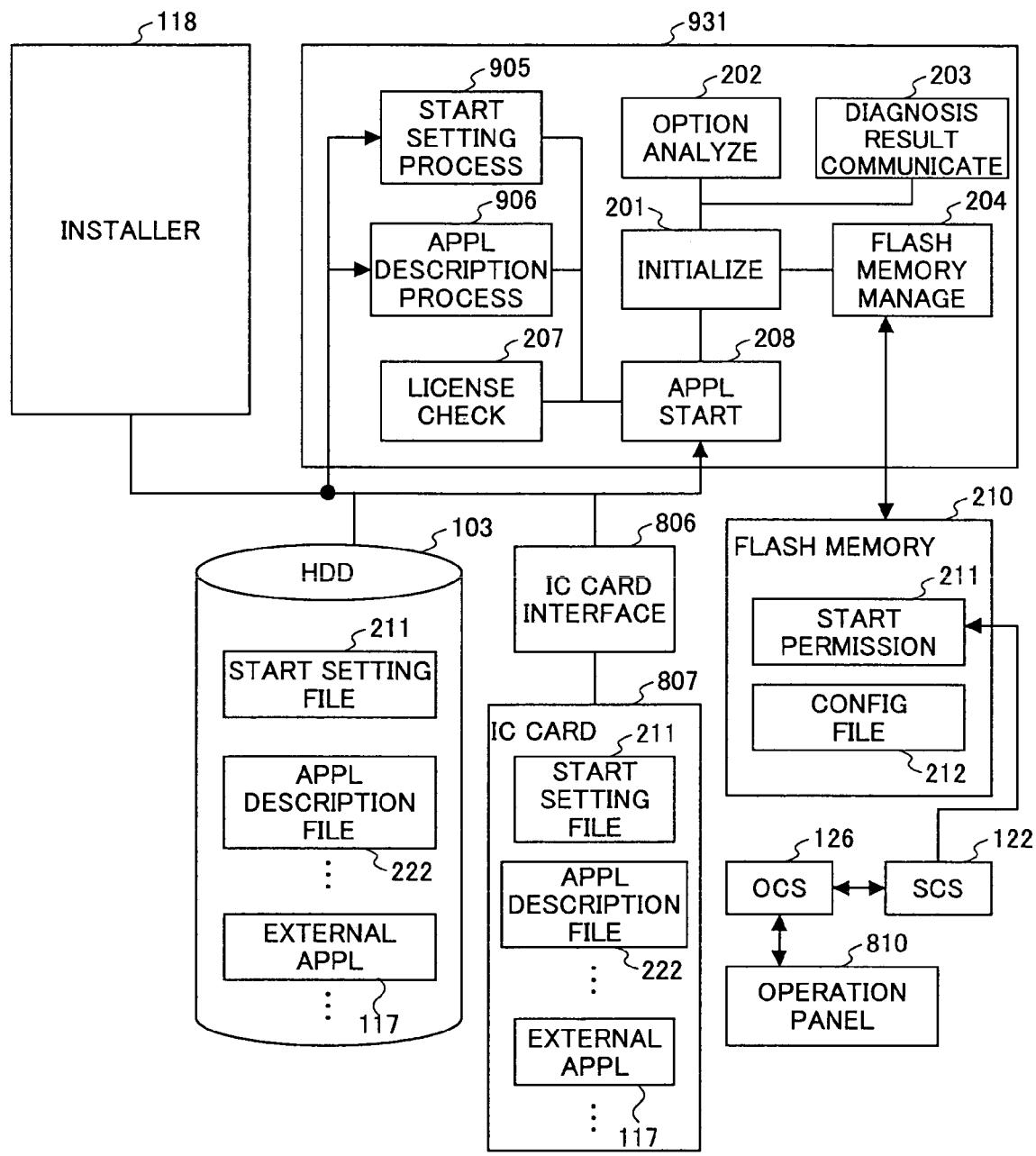
FIG. 16 is a block diagram showing a configuration centering on the external application starting part in a composite machine according to a second embodiment of the present invention.

The functional configuration and hardware configuration of the composite machine 100 according to the second embodiment of the present invention are the same as those of the composite machine 100 according to the first embodiment of the present invention described above. FIG. 16 is a block diagram showing a configuration focused on features of an external application starting part 931 of the composite machine 100 according to the second embodiment of the present invention.

As shown in FIG. 16, the external application starting part 931 includes an initialization part 201, an option analysis part 202, a diagnostic result communication part 203, a flash memory management part 204, a starting setting processing part 905, an application description processing part 906, a license check part 207, and an application starting part 908 as in the composite machine 100 according to the first embodiment of the present invention shown in FIG. 4.

The starting setting processing part 905 reads a starting setting file 221 stored in the integrated circuit card 807 other than the same stored in the HDD 103, and performs analysis processing thereon. The application description processing part 906 reads application description files 222 which are stored in the integrated circuit card 807 in addition to the same in the HDD 103, and performs analysis processing thereon. The application starting part 908 starts the external applications 117 stored in the integrated circuit card 807 in addition to those from the HDD 103.

At this time, the external applications 117 are started as a result of execution commands previously set in the application description files 222 being issued. The other configurations of the composite machine 100 according to the second embodiment of the present invention are the same as those in the first embodiment of the present invention described above, and the functions thereof are the same therebetween accordingly.

In the HDD 103, same as in the above-mentioned first embodiment, a starting setting file 221 in which one or a plurality of external applications 117 and data which indicates the external applications 117 to be started are set; and application description files 222 in which various sorts of information on the external applications 117 are set are stored in the HDD 103.

Also in the integrated circuit card 807, the starting setting file 221 in which one or a plurality of external applications 117 and data which specifies the external applications 117 to be started; and the application description files 222 in which various sorts of information on the external applications 117 are set are stored. The integrated circuit card 807 acts as an external application recording medium. Data communications are performed with the integrated circuit card 807 by an integrated circuit card interface part 806 which acts as a recording medium interface part. For the integrated card 807, a non-volatile recording medium, such as, for example, an SD card, or the like may be used. It is noted that, according to the second embodiment of the present invention, it is assumed that the IC card 807 from which the external applications 117 are started is a recording medium which is configured such that no new writing of information thereto is permitted. However, it is also possible to assume another embodiment in which an IC card configured such that new writing of information thereto is also permitted.

The contents of the starting setting file 221 and the application description files 222 are the same as those in the composite machine 100 according to the first embodiment described above. According to the second embodiment, each of the starting setting file 221 and the application description files 222 are stored in the recording medium (integrated circuit card 807) in which the external applications 117 are also stored. However, it is also possible that these files 221 and 222 may be instead stored in another recording medium such as a flash memory 210, or so.

Also in the second embodiment, in the flash memory 210, a configuration file 212 and a starting permission data 211 having information indicating whether or not starting from the HDD 103 of the external applications 117 is permitted are stored. The contents set in the starting permission data 211 are same as those in the composite machine 100 according to the first embodiment. It is also possible that information indicating whether or not starting of the external applications 117 from the integrated circuit card 807 is permitted is also stored in the above-mentioned starting permission data 211.

Figure 17:
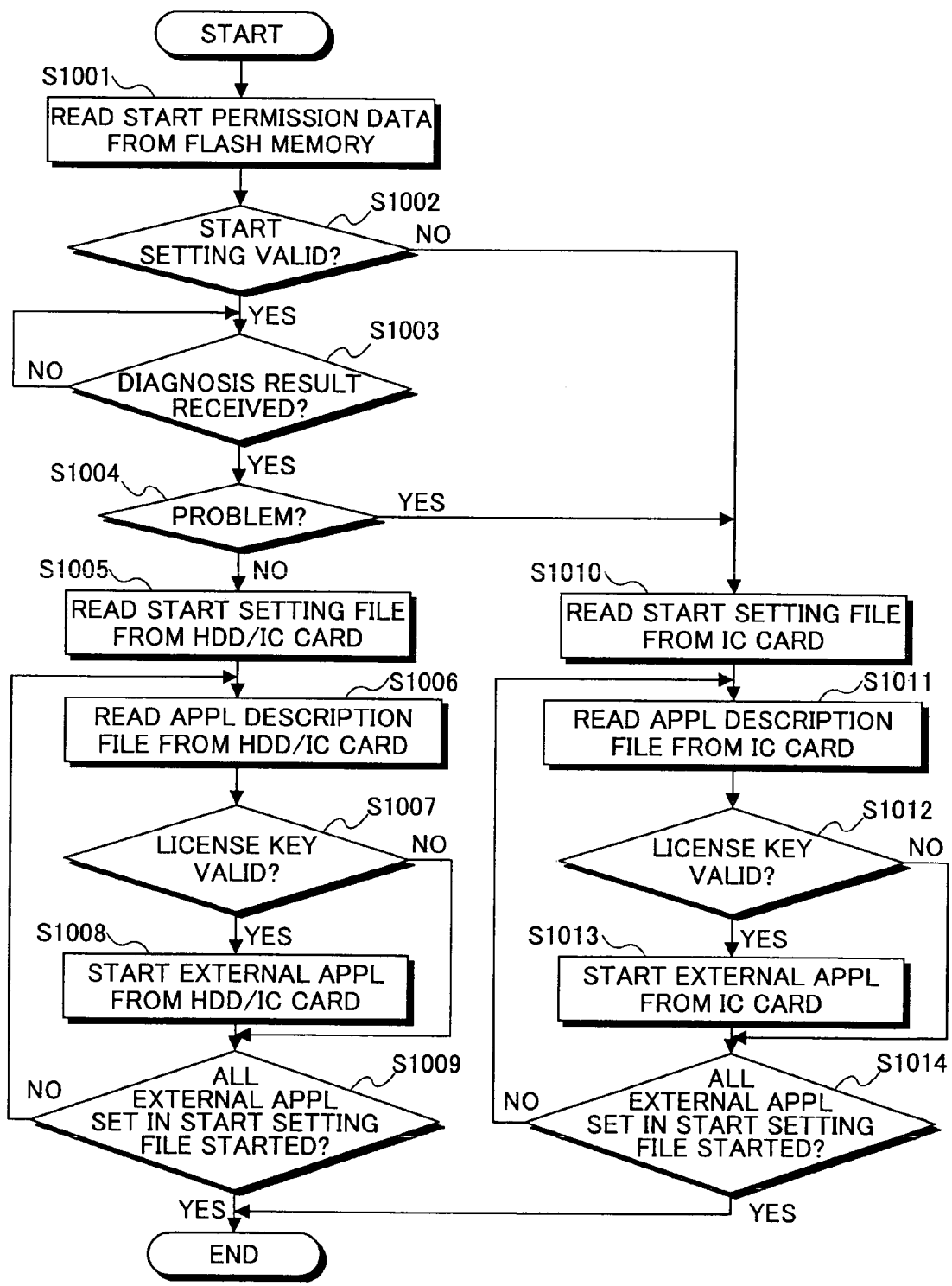
FIG. 17 shows an operation flow chart which shows a procedure of external application starting processing performed by an external application starting part of the composite machine according to the second embodiment of the present invention.

Next, starting processing of the external applications 117 by the external application starting part 931 described above according to the second embodiment will be described. FIG. 17 is a flow chart which shows the procedure of starting processing of the external applications 117 by the external application starting part 931. The external application starting part 931 reads the starting permission data 211 from the flash memory 210 first (in Step S1001), and determines whether or not starting of the external applications 117 from the HDD 103 is set validly there (Step S1002). If it is set invalid (No in Step S1001), starting of the external applications 117 from the HDD 103 is not performed, and then, starting processing of the external applications 117 is performed only from the integrated circuit card 807 (in Step S1010).

On the other hand, when the starting permission data 211 has a setting in which the starting is valid (Yes in Step S1002), starting processing of the external applications 117 both from the HDD 103 as well as from the integrated circuit card 807 is started. Then, a state of waiting for a notice of diagnostic result from the diagnostic part 132 is entered (in Step S1003). And when the diagnostic result is received from the diagnostic part 132 (Yes in Step S1003), it is determined whether or not the diagnostic result indicates a problematic situation (in Step S1004). Then, when the diagnostic result indicates a problematic situation (Yes in Step S1004), an error message or so is output to the display part of the operation panel 810, and starting of the external applications 117 from the HDD 103 is not carried out, while starting of the external applications 117 from the integrated circuit card 807 is carried out (in Step S1010).

On the other hand, when the diagnostic result does not indicate a problematic situation (No in Step S1004), in order to perform starting processing of the external application 117 from the HDD 103, the starting setting file 221 is read from each of the HDD 103 and the integrated circuit card 807, and the program names of all the external applications 117 installed in the HDD 103 and the integrated circuit card 807 are acquired which names are set in the starting setting files 221 (in Step S1005). Next, the application description file 222 of each of the external applications 117 having the thus-obtained program names is read from the HDD 103 and the integrated circuit card 807 (Step S1006).

And the license key set in the application description files 222 is examined so as to determine whether or not the license key is valid, i.e., whether or not the validity date is expired, or whether or not another problematic situation occurs (in Step S1007). And when it is determined that the license key is valid (Yes in Step S1007), the relevant external application 117 is started from the HDD 103 or from the integrated circuit card 807 (in Step S1008). At this time, the application starting part 308 of the external application starting part 131 starts the external application 117 from the HDD 103 or the integrated circuit card 807 by issuing an execution command set previously in the relevant application description file 222.

On the other hand, when it is determined that the license key is not valid (No in Step S1007), starting of the external application 117 from the HDD 103 or the integrated circuit card 807 is not performed. At this time, an error message to that effect may be output to the display part of the operation panel 810.

When the integrated circuit card interface part 806 has no integrated circuit card 807 inserted therein, only the external applications 117 installed in the HDD 103 are started.

Processing of Steps S1006 to S1009 is repeatedly performed for all the external applications 117 set in the starting setting files 221 of the HDD 103 and of the integrated circuit card 807 (in Step S1014). All the external applications 117 stored in the HDD 103 and in the integrated circuit card 807 are thus started, and they operate then in the application layer.

In Step S1002, when it is determined that starting of the external applications 117 from the HDD 103, is set invalid, or when it is notified in Step S1004 that the diagnostic result on the HDD 103 indicates a problematic situation, starting of the external applications 117 from the HDD 103 is not performed. On the other hand, at this time, starting processing for the external applications 117 is performed from the integrated circuit card 807.

In this case, first, the starting setting file 221 is read from the integrated circuit card 807, and the program names set in the starting setting file 221, i.e., the program names of all the external applications 117 installed in the integrated circuit card 807 are acquired (in Step S1010). Next, the application description files 222 of the external applications 117 of thus-acquired program names are read from the integrated circuit card 807 (in Step S1011).

And the validity of the license key set in each of the application description files 222 is verified (in Step S1012). And when it is determined that the license key is valid (Yes in Step S1012), the relevant external application 117 is started from the integrated circuit card 807 (in Step S1013).

On the other hand, when it is determined that the license key is not valid (No in Step S1012), starting of the external application 117 from the integrated circuit card 807 is not performed. In this case, an error message to that effect may be output to the display part of the operation panel 810.

Processing of Steps S1011 to S1013 is repeatedly performed for all the external applications 117 set in the starting setting file 221 of the integrated circuit card 807 (in Step S1014). All the external applications 117 stored in the integrated circuit card 807 are thus started, and they operate in the application layer.

Thus, in the composite machine 100 according to the second embodiment of the present invention, since the external application starting part 931 starts the external applications 117 stored in the HDD 103 after diagnosis of the HDD 103 is completed and also starts those stored in the integrated circuit card 807, not only the HDD 103 but also the integrated circuit card 807 are used as storages for the external applications 117. Thereby, even it is possible to start the external applications 117 from the HDD 103 which may not be sufficiently reliable by itself, the reliability in the composite machine 100 can be maintained by utilization of the other recording medium, i.e., the integrated circuit card 807. Thereby, the integrated circuit card 807 and the HDD 103 can be used for the purpose of arbitrarily inserting the external applications 117 to the composite machine 100, which are then started in the composite machine 100, after the shipment of the composite machine 100. Thus, various new functions can be carried out in the composite machine 100.

Moreover, in the composite machine 100 according to the second embodiment of the present invention, in case where a diagnostic result of the HDD 103 indicates a problematic situation and this matter is notified to the external application part 931, only the external applications 117 stored in the integrated circuit card 807 are started. Thereby, even in case where the HDD 103 has a trouble, starting processing can be continued from the integrated circuit card 807, and thus, the functions by the external applications 117 from the integrated circuit card 807 can be realized in the composite machine 100.

Moreover, in the composite machine 100 according to the second embodiment of the present invention, in case where a setting is made such that starting of the external applications 117 from the HDD 103 is not carried out in the starting permission data 211, only the external applications 117 stored in the integrated circuit card 807 are started by the external application starting part 931. Therefore, it is possible for a user to arbitrarily set whether or not the external applications 117 should be started from the HDD 103. Therefore, the various functions by the, external applications 117 from the integrated circuit card 807 are enjoyable while a use of the external applications 117 of the HDD 103 is controlled appropriately depending on an intension of the user.

It is noted that, in the processing of starting of the external applications shown in FIG. 17, starting of the external applications from the IC card 807 may be performed immediately after the determination in Step S1002 indicating that the starting is valid, without waiting the completion of the diagnosis processing for the issuance of the diagnosis result in Step S1004.

Although an example in which the HDD 103 is applied as a large-capacity storage device in the composite machine 100 according to the first and second embodiments of the present invention, it is possible to apply another type of recording medium for the same purpose, for example, an SD card may be applied there.

Further, the present invention is not limited to the above-described embodiments, and variations and modifications may be made without departing from the basic concept of the present invention.

The present application is based on Japanese priority application No. 2002-255970, filed on Aug. 30, 2002, the entire contents of which are hereby incorporated by reference.

What is claimed is:

1. An image processing apparatus comprising:
   a first storage configured to store an application which realizes at least one of a copying function, a printer function, an optical image scanning function and a facsimile function; and
   a second storage configured to store an external application which is installed by means of an installing part configured to install an application, and is added after the image processing apparatus is shipped,
   wherein said image processing apparatus performs image processing utilizing the applications stored in said first and second storages,
   wherein when the image processing apparatus is started up, the application stored in the first storage is started up, predetermined diagnosis processing is performed on said second storage and the external application is started up when the predetermined diagnosis processing is finished, and
   when the application stored in said first storage is started up, the starting up is performed independently from the predetermined diagnosis processing being performed on said second storage, and, even during the diagnosis processing being performed on the second storage, processing concerning the function realized by the application can be performed.

2. The image processing apparatus as claimed in claim 1, wherein starting permission information is provided, the starting permission information setting whether or not execution from said second storage is to be performed, and
   the external application is executed from said second storage when the starting permission information has a setting indicating that execution from said second storage is to be performed.

3. The image processing apparatus as claimed in claim 2, wherein:
   a function is provided in which a setting window for an operator to set the starting permission information is displayed.

4. The image processing apparatus as claimed in claim 1, wherein:
   validity of a license set on an application is verified, and, when the license is determined as valid, the relevant application is executed.

5. The image processing apparatus according to claim 1, wherein the predetermined diagnosis processing performed on said second storage checks the second storage for problems which correspond to physical or logical damage of said second storage, the physical or logical damage being damage which prevents reading and writing to at least a portion of the second storage.

6. The image processing apparatus according to claim 1, wherein the processing concerning the function realized by the application is copy processing or facsimile transmission processing.

7. An image processing apparatus comprising:
   a first storage configured to store an application which realizes at least one of a copying function, a printer function, an optical image scanning function and a facsimile function;
   a second storage configured to store an external application which is installed by means of an installing part configured to install the external application, and is added after the image processing apparatus is shipped; and
   a third storage configured to store a second application,
   wherein said image processing apparatus performs image processing utilizing the applications stored in said first, second and third storages,
   wherein when the image processing apparatus is started up, the application stored in the first storage is started up, predetermined diagnosis processing is performed on said second storage and the external application is started up when the predetermined diagnosis processing is finished, and
   when the second application stored in said third storage is started up, the starting up is performed independently from the predetermined diagnosis processing being performed on said second storage, and, even during the diagnosis processing being performed on the second storage, processing concerning a function realized by the second application can be performed.

8. The image processing apparatus as claimed in claim 7, wherein starting permission information is provided, the starting permission information setting whether or not execution from said second storage is to be performed, and
   the external application is executed from said second storage when the starting permission information has a setting indicating that starting from said second storage is to be performed.

9. The image processing apparatus as claimed in claim 8, wherein:
   a function is provided in which a setting window for an operator to set the starting permission information is displayed.

10. The image processing apparatus as claimed in claim 7, wherein:
    validity of a license set on an application is verified, and, when the license is determined as valid, the relevant application is executed.

11. An image processing method for performing image processing with utilization of applications stored in first and second storages, comprising:
    storing, in said first storage, an application which realizes at least one of a copying function, a printer function, an optical image scanning function and a facsimile function;
    storing, in said second storage, an external application which is installed by means of an installing part configured to install an application, and is added after the image processing apparatus is shipped;

when the image processing apparatus is started up, starting up the application stored in the first storage, performing predetermined diagnosis processing on said second storage and starting up the external application when the predetermined diagnosis processing is finished, when the application stored in said first storage is started up, the starting up is performed independently from the predetermined diagnosis processing being performed on said second storage, and, even during the diagnosis processing being performed on the second storage, performing processing concerning the function realized by the application.

12. The image processing method as claimed in claim 11, further comprising the steps of:

providing starting permission information, the starting permission information setting whether or not execution from said second storage is to be performed; and executing the external application from said second storage when the starting permission information has a setting indicating that execution from said second storage is to be performed.

13. The image processing method as claimed in claim 12, further comprising the step of:

displaying a setting window for an operator to set the starting permission information.

14. The image processing method as claimed in claim 11, further comprising the steps of:

verifying validity of a license set on an application; and when the license is determined as valid, executing the relevant application.

15. An image processing method for performing image processing with utilization of applications stored in first and second storages, comprising:

storing, in said first storage, an application which realizes at least one of a copying function, a printer function, an optical image scanning function and a facsimile function;

storing, in said second storage, an external application which is installed by means of an installing part configured to install an application, and is added after the image processing apparatus is shipped;

storing a second application in said a third storage;

when the image processing apparatus is started up, starting up the application stored in the first storage, performing predetermined diagnosis processing on said second storage and starting up the external application when the predetermined diagnosis processing is finished; and when the second application stored in said third storage is started up, the starting up is performed independently from the predetermined diagnosis processing being performed on said second storage, and, even during the diagnosis processing being performed on the second storage, performing processing concerning a function realized by the second application.

16. The image processing method as claimed in claim 15, further comprising the steps of:

providing starting permission information, the starting permission information setting whether or not execution from said second storage is to be performed; and executing the external application from said second storage when the starting permission information has a setting indicating that execution from said second storage is to be performed.

17. The image processing method as claimed in claim 16, further comprising the step of:

displaying a setting window for an operator to set the starting permission information.

18. The image processing method as claimed in claim 15, further comprising the steps of:

verifying the validity of a license set on an application; and when the license is determined as valid, executing the relevant application.

19. A computer readable medium including a program for causing a computer to perform an image processing, with utilization of applications stored in first and second storages, method comprising:

storing, in said first storage, an application which realizes at least one of a copying function, a printer function, an optical image scanning function and a facsimile function;

storing, in said second storage, an external application which is installed by means of an installing part configured to install an application, and is added after the image processing apparatus is shipped;

when the image processing apparatus is started up, starting up the application stored in the first storage, performing predetermined diagnosis processing on said second storage and starting up the external application when the predetermined diagnosis processing is finished, when the application stored in said first storage is started up, the starting up is performed independently from the predetermined diagnosis processing being performed on said second storage, and, even during the diagnosis processing being performed on the second storage, performing processing concerning the function realized by the application.

20. The computer readable medium as claimed in claim 19, further comprising:

providing starting permission information, the starting permission information setting whether or not execution from said second storage is to be performed; and executing the external application from said second storage when the starting permission information has a setting indicating that execution from said second storage is to be performed.

21. The computer readable medium as claimed in claim 20, further comprising:

displaying a setting window for an operator to set the starting permission information.

22. The computer readable medium as claimed in claim 19, further comprising:

verifying the validity of a license set on an application; and when the license is determined as valid, executing the relevant application.

23. A computer readable medium including a program stored thereon for causing a computer to perform an image processing, with utilization of applications stored in first and second storages, method comprising:

storing, in said first storage, an application which realizes at least one of a copying function, a printer function, an optical image scanning function and a facsimile function;

storing, in said second storage, an external application which is installed by means of an installing part configured to install an application, and is added after the image processing apparatus is shipped;

storing a second application in said a third storage;

when the image processing apparatus is started up, starting up the application stored in the first storage, performing predetermined diagnosis processing on said second storage and starting up the external application when the predetermined diagnosis processing is finished; and when the second application stored in said third storage is started up, the starting up is performed independently from the predetermined diagnosis processing being performed on said second storage, and, even during the diagnosis processing being performed on the second storage, performing processing concerning a function realized by the second application.

24. The computer readable medium as claimed in claim 23, further comprising:
providing starting permission information, the starting permission information setting whether or not execution from said second storage is to be performed is set; and
executing the external application from said second storage when the starting permission information has a setting indicating that execution from said second storage is to be performed.

25. The computer readable medium as claimed in claim 24, further comprising:
displaying a setting window for an operator to set the starting permission information.

26. The computer readable medium as claimed in claim 23, further comprising:
verifying the validity of a license set on an application; and
when the license is determined as valid, executing the relevant application.

* * * * *